(12) United States Patent
Knodt et al.

(10) Patent No.: US 9,641,570 B2
(45) Date of Patent: May 2, 2017

(54) ELECTRONIC INFORMATION COLLABORATION SYSTEM

(71) Applicants: Kurt Knodt, Palo Alto, CA (US);
Jayasimha Nuggehalli, Cupertino, CA (US); James Woo, Los Altos, CA (US);
Guiluan Luo, Dublin, CA (US);
Srikrishna Narasimhan, Sunnyvale, CA (US)

(72) Inventors: Kurt Knodt, Palo Alto, CA (US);
Jayasimha Nuggehalli, Cupertino, CA (US); James Woo, Los Altos, CA (US);
Guiluan Luo, Dublin, CA (US);
Srikrishna Narasimhan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/781,438

(22) Filed: Feb. 28, 2013

(65) Prior Publication Data
US 2014/0245173 A1     Aug. 28, 2014

(51) Int. Cl.
*H04L 29/06*       (2006.01)
*H04W 4/04*        (2009.01)
(Continued)

(52) U.S. Cl.
CPC ........ *H04L 65/403* (2013.01); *H04L 65/1069* (2013.01); *H04L 65/4038* (2013.01);
(Continued)

(58) Field of Classification Search
CPC ... H04L 41/22; H04L 65/403; H04L 65/1069; H04L 65/4038; H04L 65/1006;
(Continued)

(56) References Cited

U.S. PATENT DOCUMENTS 6,330,976 B1 * 12/2001 Dymetman et al. .......... 235/487
7,256,900 B1 *  8/2007 Hanaoka ...................... 358/1.12
(Continued)

OTHER PUBLICATIONS

U.S. Appl. No. 13/781,451, filed Feb. 28, 2013, Final Office Action.
U.S. Appl. No. 13/781,447, filed Feb. 28, 2013, Office Action.

*Primary Examiner* — Kieu Vu
*Assistant Examiner* — Blaine Basom
(74) *Attorney, Agent, or Firm* — Hickman Palermo Becker Bingham LLP; Edward A. Becker

(57) ABSTRACT

An approach for electronic information collaboration allows the use of a mobile device to cause electronic information to be displayed on one or more projector display devices via a virtual projector. The use of a virtual projector allows electronic information to be displayed on multiple projector display devices and/or client devices. The approach may also include the use of collaboration clients and a collaboration server to provide additional functionality with respect to the electronic information including, for example, the ability for changes made to electronic information at one location to be propagated to another location. The approach also allows a mobile device to be used to establish a videoconferencing session between two or more videoconferencing sites. The approach may include generation and use of a locations map that displays icons that correspond to videoconferencing sites and that may be selected to establish a connection between videoconferencing sites.

20 Claims, 18 Drawing Sheets

(51) Int. Cl.
  *H04N 7/14* (2006.01)
  *H04N 7/15* (2006.01)
  *G06F 3/0484* (2013.01)
  *G06F 3/0487* (2013.01)

(52) U.S. Cl.
  CPC ............. *H04N 7/147* (2013.01); *H04N 7/15* (2013.01); *H04W 4/04* (2013.01); *G06F 3/0487* (2013.01); *G06F 3/04842* (2013.01); *H04L 65/1006* (2013.01); *H04L 65/4015* (2013.01)

(58) Field of Classification Search
  CPC . H04L 65/4015; H04L 12/1822; H04N 7/147; H04N 7/15; H04N 7/155; G06F 3/0482; G06F 3/0487; H04W 4/04
  USPC ........................................................ 715/734
  See application file for complete search history.

(56) References Cited

U.S. PATENT DOCUMENTS

| | | | |
|---|---|---|---|
| 7,293,067 B1* | 11/2007 | Maki et al. | 709/217 |
| 7,630,721 B2 | 12/2009 | Ortiz | |
| 7,716,588 B2* | 5/2010 | Iwamura | 715/736 |
| 8,356,251 B2 | 1/2013 | Strober | |
| 8,384,660 B2* | 2/2013 | Ichieda | H04N 5/74 345/156 |
| 8,532,632 B2* | 9/2013 | Boudville | 455/414.1 |
| 9,158,648 B2* | 10/2015 | Bartlett | G06F 11/3055 |
| 9,178,723 B2* | 11/2015 | Chueh | H04L 12/66 |
| 2001/0052995 A1* | 12/2001 | Idehara | 358/1.15 |
| 2004/0130568 A1 | 7/2004 | Nagano et al. | |
| 2004/0221230 A1 | 11/2004 | Kakemura | |
| 2008/0229208 A1* | 9/2008 | Sahashi et al. | 715/736 |
| 2009/0015515 A1 | 1/2009 | Ichieda | |
| 2010/0019989 A1 | 1/2010 | Odagawa | |
| 2010/0050081 A1 | 2/2010 | Lee et al. | |
| 2012/0079368 A1 | 3/2012 | Abdelaziz et al. | |
| 2012/0151357 A1* | 6/2012 | Roche et al. | 715/736 |
| 2012/0151364 A1* | 6/2012 | Chueh | H04L 12/66 715/736 |
| 2012/0199647 A1* | 8/2012 | Hwang et al. | 235/375 |
| 2012/0211559 A1* | 8/2012 | Okuyama | H04L 67/141 235/375 |
| 2012/0221960 A1 | 8/2012 | Robinson | |
| 2012/0280911 A1* | 11/2012 | Su | G06F 3/03542 345/166 |
| 2012/0315009 A1 | 12/2012 | Evans et al. | |
| 2013/0132859 A1 | 5/2013 | Chou et al. | |
| 2013/0151582 A1 | 6/2013 | Ichieda | |
| 2013/0246644 A1 | 9/2013 | Garcia et al. | |
| 2013/0276075 A1* | 10/2013 | Gong | H04W 76/02 726/5 |
| 2014/0001253 A1* | 1/2014 | Smith | G06Q 20/3276 235/375 |
| 2014/0085309 A1* | 3/2014 | Czapar | 345/441 |
| 2014/0240445 A1 | 8/2014 | Jaynes | |
| 2014/0244720 A1 | 8/2014 | Knodt et al. | |
| 2014/0245185 A1 | 8/2014 | Knodt et al. | |

\* cited by examiner

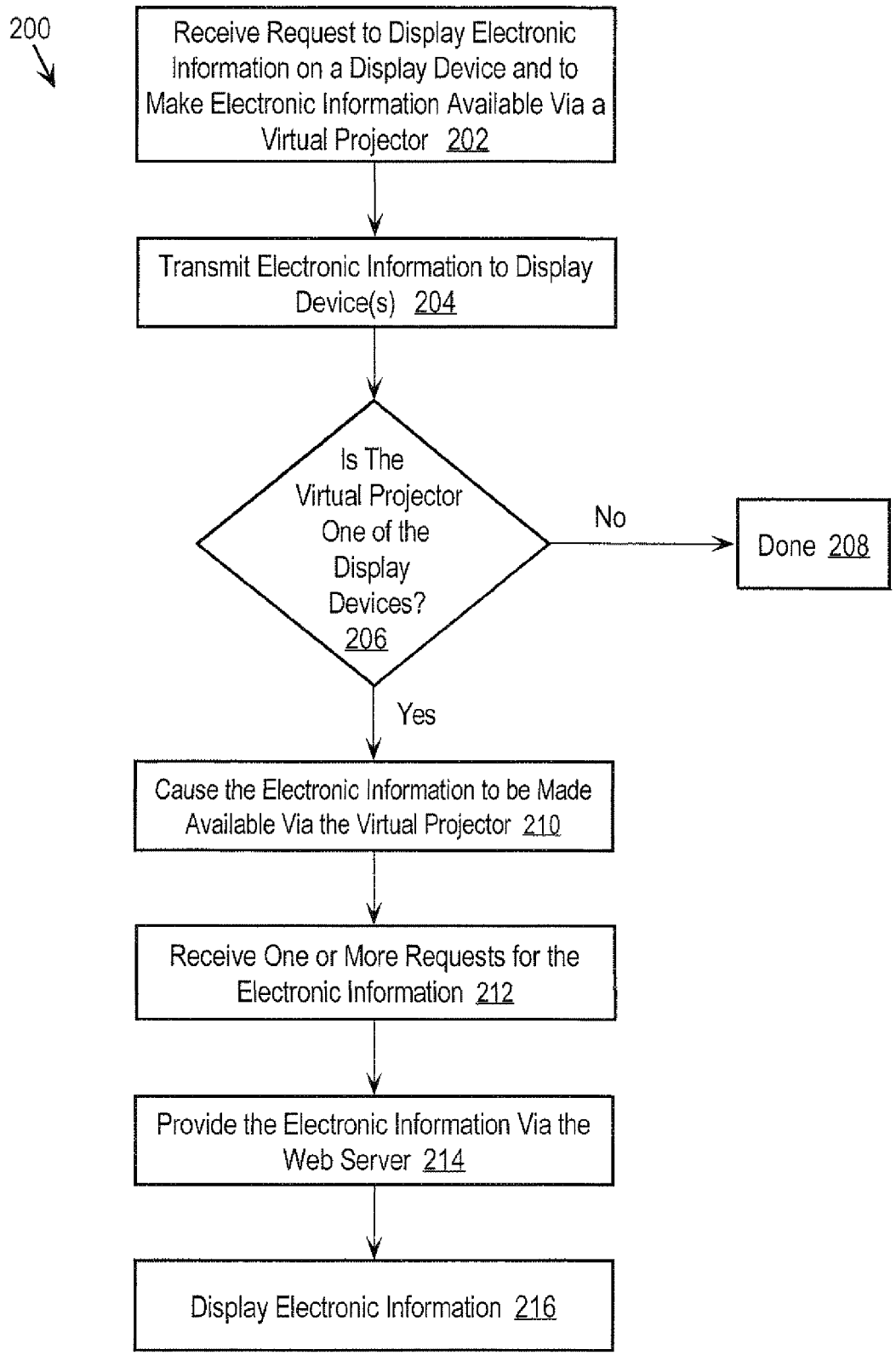

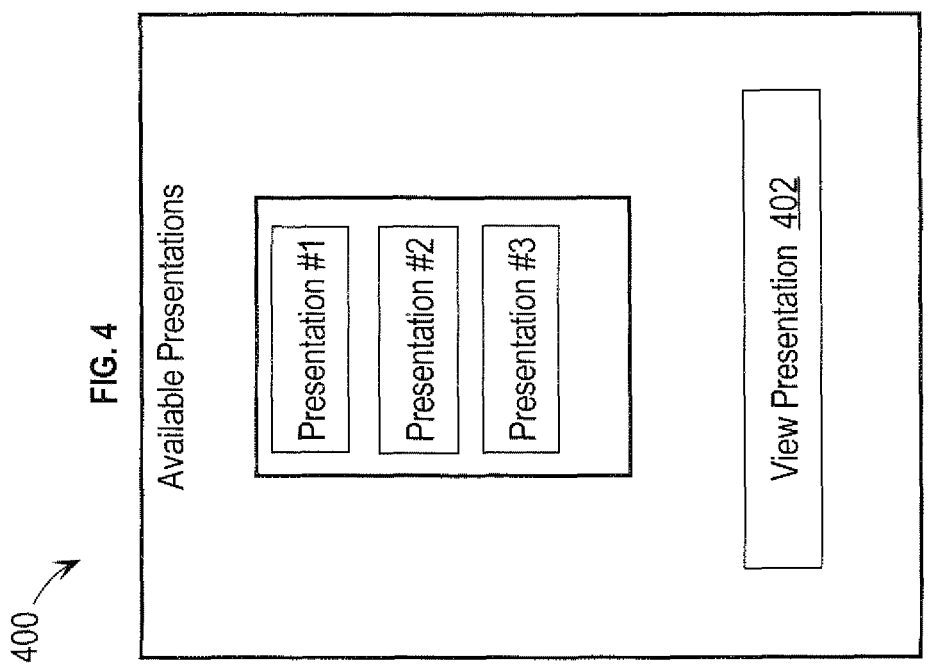

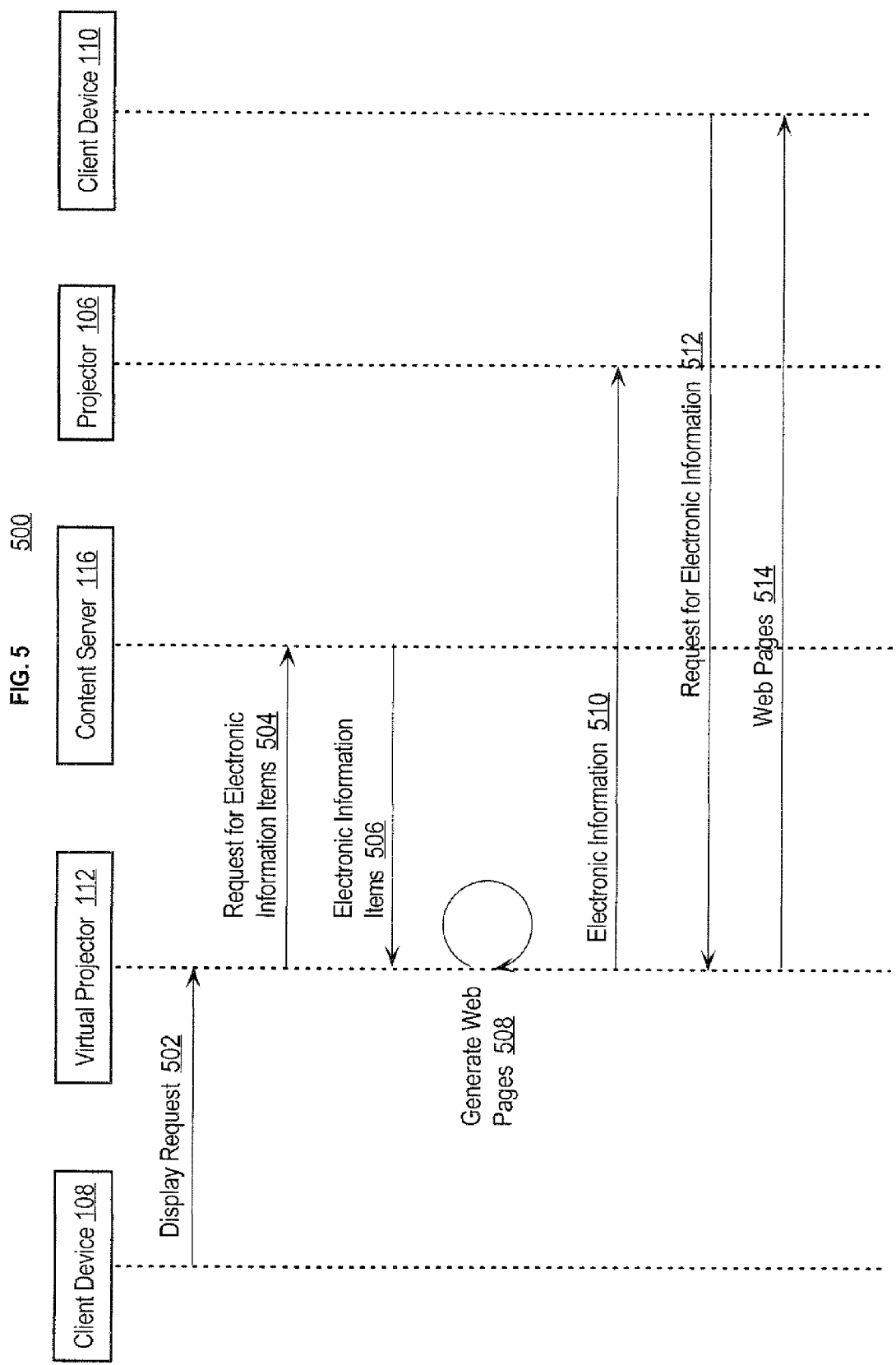

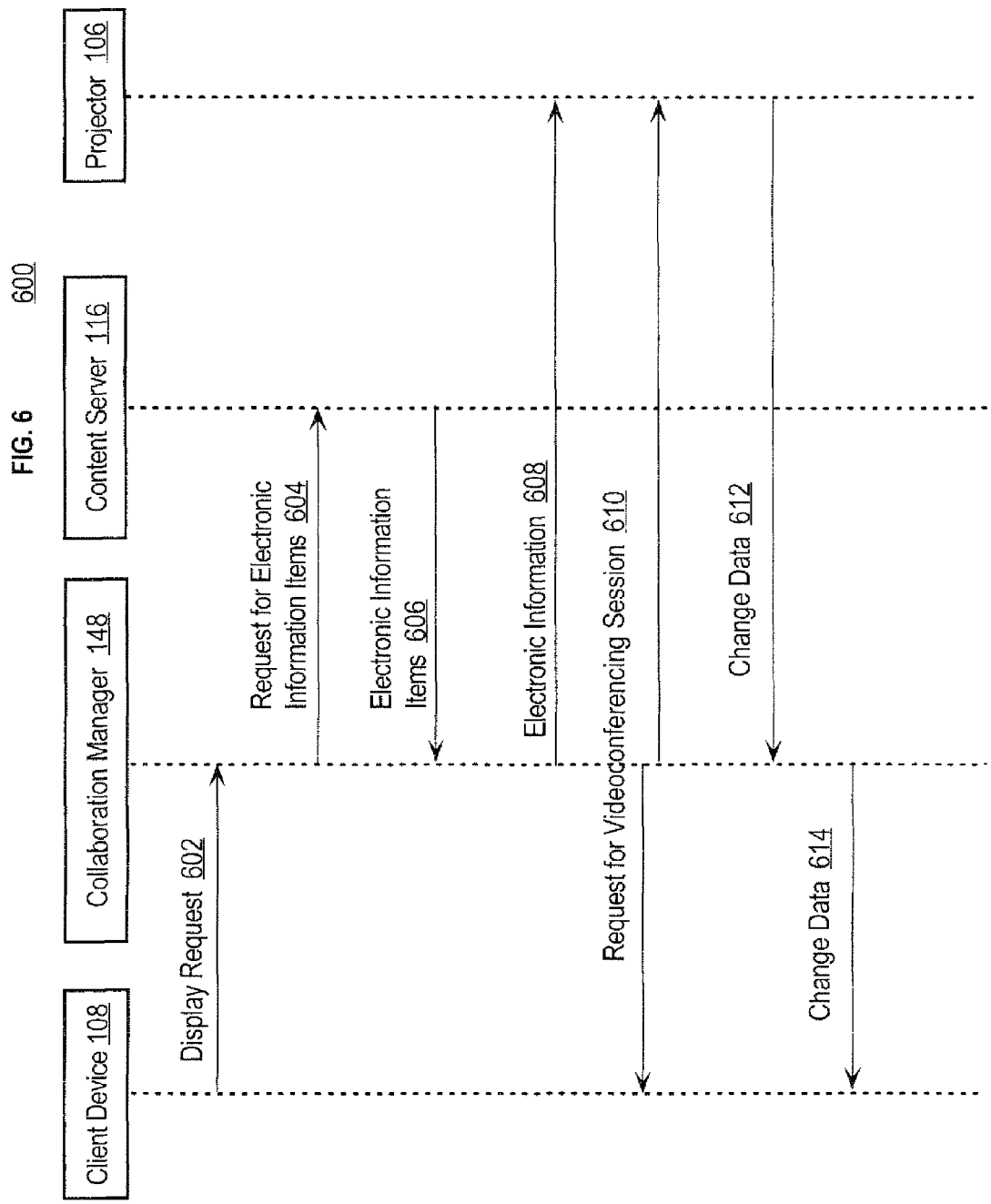

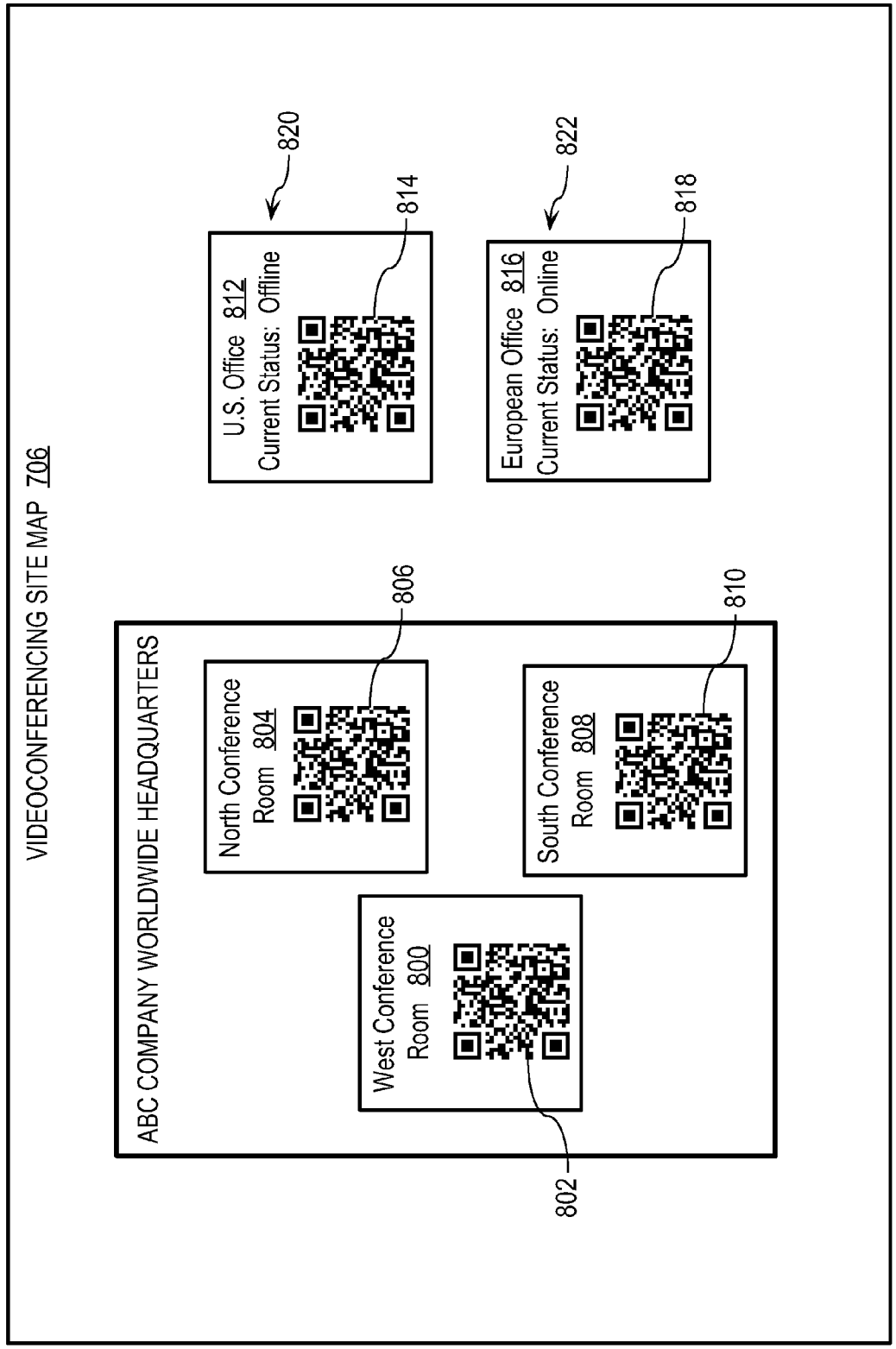

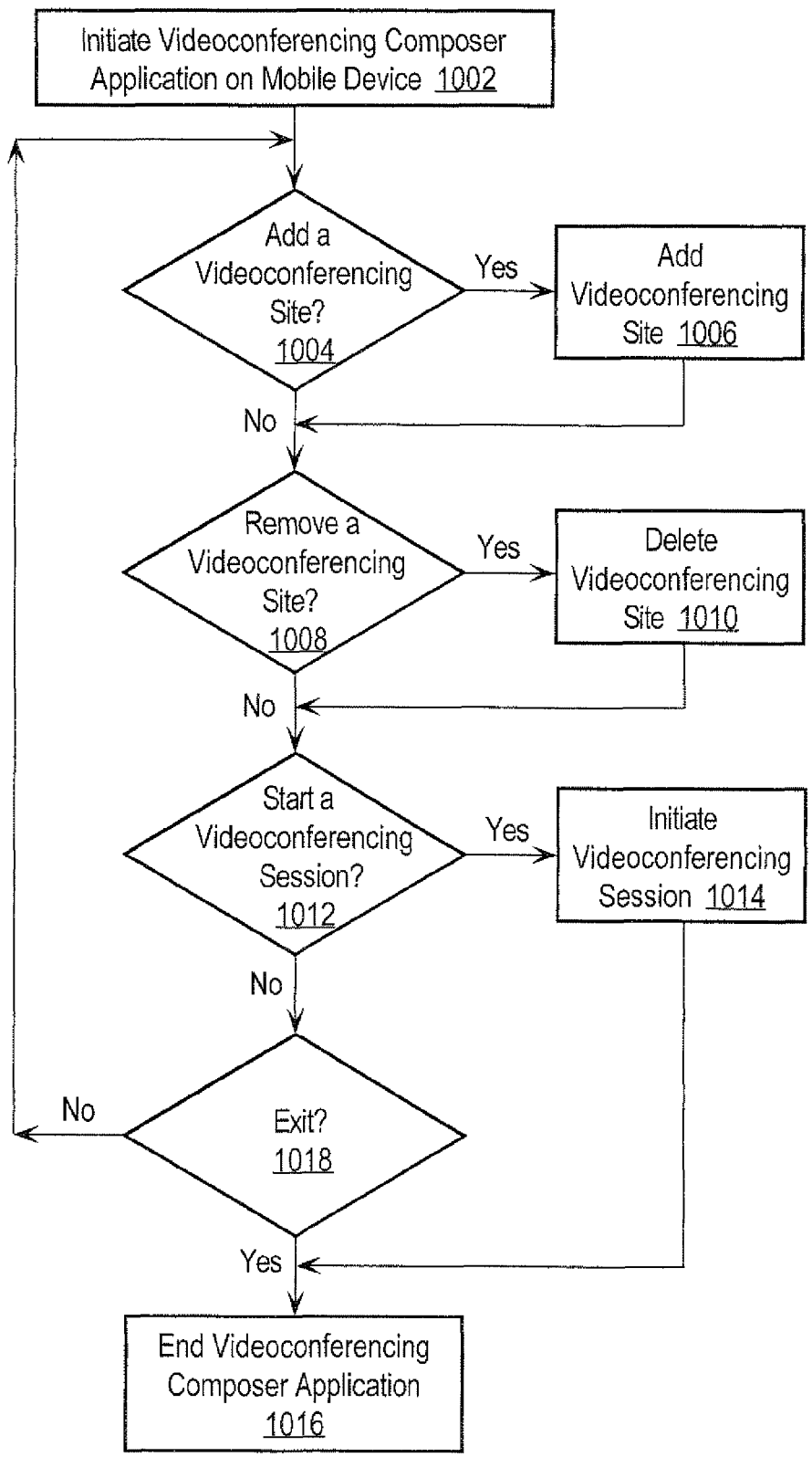

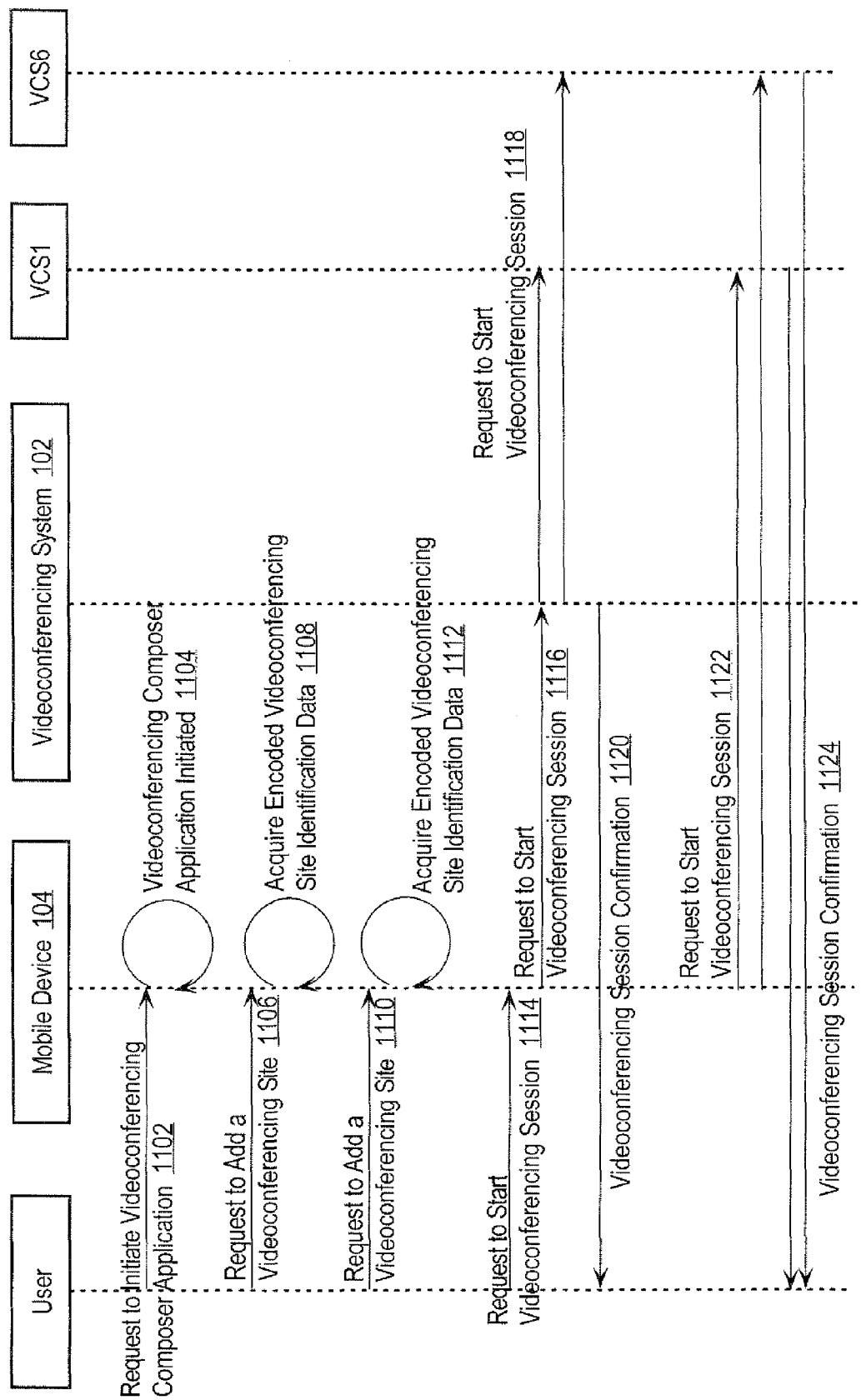

ELECTRONIC INFORMATION COLLABORATION SYSTEM

FIELD

Embodiments relate generally to the sharing of electronic information, and more specifically, to an approach for electronic information collaboration.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Conventional methods of electronic information collaboration have limitations. For example, conventional approaches are generally peer-to-peer systems that allow users of only two client systems to share information from a single source in a single format. Also, the process of establishing videoconferencing sessions can be non-user friendly. Users typically schedule a videoconferencing session via telephone, email or calendar software. At the scheduled time, the users go to a location, such as a conference room, that has the equipment necessary to participate in the videoconferencing session. To initiate the videoconferencing session, users are often required to use videoconferencing equipment and/or software with which they are unfamiliar. This often results in an unsatisfactory user experience and it is not uncommon for users to request the assistance of information technology (IT) personnel to assist in establishing a videoconferencing session.

SUMMARY

An approach comprises selecting a first audio/video device and a second audio/video device from a locations map and automatically establishing a connection between the first audio/video device and the second audio/video device. The approach may be implemented as a method, on or by one or more computing devices, or implemented by instructions stored on one or more computer-readable media.

BRIEF DESCRIPTION OF THE DRAWINGS

In the figures of the accompanying drawings like reference numerals refer to similar elements.

FIG. 2 is a flow diagram that depicts an approach for electronic information collaboration.

FIG. 4 depicts an example graphical user interface provided by the Web server of a virtual projector.

FIG. 5 is a diagram that depicts an exchange of messages between elements of an arrangement that provides for the display of electronic information on multiple display devices using a virtual projector.

FIG. 6 is a diagram that depicts an exchange of messages between elements of an arrangement that provides for electronic information collaboration from a mobile device.

FIG. 8A is an example embodiment of videoconferencing site map that depicts a plurality of videoconferencing sites.

FIG. 10 is a flow diagram that depicts an approach for establishing a videoconferencing session using a mobile device.

FIG. 11 is a diagram that depicts an example exchange of messages between elements of a videoconferencing arrangement when establishing a videoconferencing session.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. DISPLAYING ELECTRONIC INFORMATION ON MULTIPLE DISPLAY DEVICES USING A VIRTUAL PROJECTOR
IV. ELECTRONIC INFORMATION COLLABORATION USING A MOBILE DEVICE
V. VIDEOCONFERENCING SITE MAP ARCHITECTURE
VI. VIDEOCONFERENCING SITE MAPS
VII. MOBILE DEVICES
VIII. ESTABLISHING A VIDEOCONFERENCING SESSION USING MOBILE DEVICES
IX. USING ENCODED DATA TO PROVIDE ACCESS TO INFORMATION
X. IMPLEMENTATION MECHANISMS

I. Overview

An approach is provided that allows electronic information collaboration. More specifically, the approach allows the use of a mobile device to cause electronic information to be displayed on one or more projector display devices via a virtual projector. The use of a virtual projector allows electronic information to be displayed on multiple projector display devices and/or client devices. The electronic information may include electronic information from one or more devices. For example, electronic information from a single client device may be displayed on multiple projector display devices. As another example, electronic information from two different devices may be displayed on multiple projector display devices. The approach may also include the use of collaboration clients and a collaboration server to provide additional functionality with respect to the electronic information including, for example, the ability for changes made to electronic information at one location to be propagated to another location. The approach also allows a mobile device to be used to establish a connection between two or more audio/video equipment items, such as video conferencing sites. The type of connection may vary depending upon a particular implementation and the approaches described herein are not limited to any particular types of connections. Example connection types include, without limitation, voice connections, data connections, videoconferencing sessions and shared whiteboard sessions. As used herein, the term "videoconferencing site" refers to a location that has computer hardware, computer software and other equipment that makes videoconferencing available to one or more users at a the location.

II. System Architecture

Figure 1:
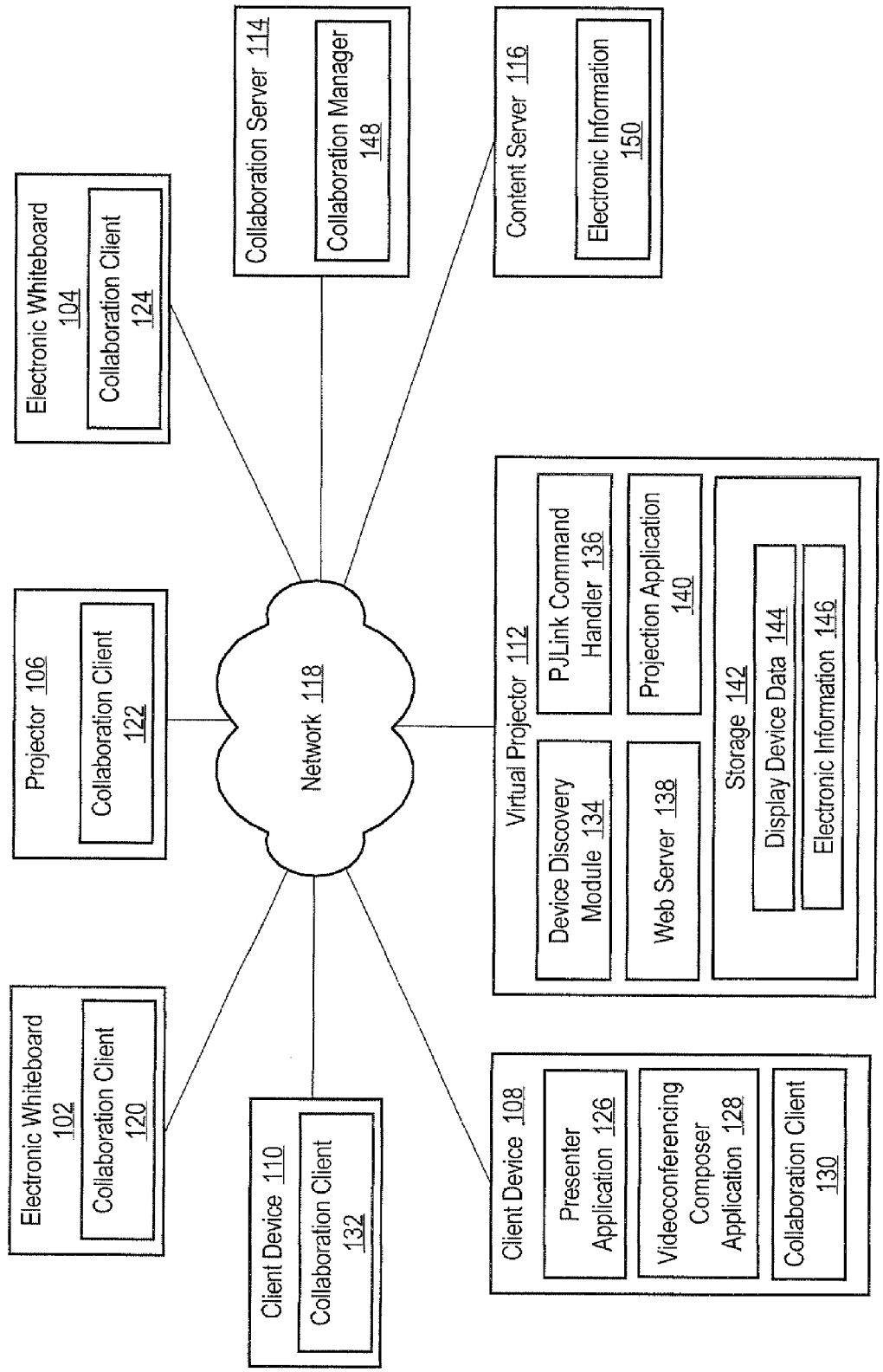
FIG. 1 is a block diagram that depicts an arrangement for electronic information collaboration.

FIG. 1 is a block diagram that depicts an arrangement 100 for electronic information collaboration. Arrangement includes electronic whiteboards 102, 104 and a projector 106, communicatively coupled to a client devices 108, 110, a virtual projector 112, a collaboration server 114 and a content server 116 via a network 118. Network 118 may be implemented using a wide variety of communications links that may vary depending upon a particular implementation. For example, network 118 may include one or more Local Area Networks (LANs), Wide Area Networks (WANs), packet-switched networks, such as the Internet, terrestrial or satellite links, or other types of wireless links. Electronic whiteboards 102, 104, projector 106, virtual projector 110 and collaboration server 114 may be co-located in the same physical location or located in physically-disparate locations, depending upon a particular implementation, and the approach described herein is not limited to these elements being in any particular physical location(s).

Electronic whiteboards 102, 104 and projector 106 each include computer hardware, computer software and other electronic components and equipment to provide for the display of electronic information. The approaches described herein are not limited to electronic whiteboards 102, 104 and projector 106 having any particular computer hardware, computer software and other equipment configuration. For example, electronic whiteboards 102, 104 and projector 106 may include a computing device, such as a personal computer, tablet computer or mobile device that has network connectivity, a camera, microphone, speaker and computer software that supports the display of electronic information. As another example, electronic whiteboards 102, 104 and projector 106 may include special purpose computer hardware, computer software and equipment. Projector 106 may be any type of projector, including, for example, a short range projector that is located adjacent a display surface. Electronic whiteboards 102, 104 and projector 106 do not necessary include the same computer hardware, computer software and equipment and the computer hardware, computer software and equipment at electronic whiteboards 102, 104 and projector 106 may vary, depending upon a particular implementation. In addition, electronic whiteboards 102, 104 and projector 106 may have different capabilities. For example, projector 106 may be a read-only device that does not allow user input, while electronic whiteboards 102, 104, are read/write devices that both display information and allow user input. The approaches described herein are not limited to the particular display devices depicted in FIG. 1, e.g., the electronic whiteboards 102, 104 and the projector 106, and are applicable to any type of display device. Example display devices include, without limitation, workstations, desktop computers, personal computers, laptop computers, tablet computers, projectors, whiteboards, monitors, personal digital assistants, mobile computing devices and telephony devices. Each electronic whiteboards 102, 104 and projector 106 is configured to communicate with one or more of the other elements in arrangement 100 via network 118. According to one embodiment, electronic whiteboards 102, 104 and projector 106 each include a collaboration client 118, 120, 122, respectively, which, in conjunction with collaboration server 114, enables additional functionality to be performed with respect to electronic information displayed on electronic whiteboards 102, 104 and projector 106. The approaches described herein are not limited to electronic information collaboration on electronic whiteboards 102, 104 and projector 106 and are applicable to any type of display device capable of displaying electronic information.

Client devices 108, 110 may be any type of mobile devices and the approach is not limited to any particular type of mobile device. Examples of client devices 108, 110 include, without limitation, personal computers, laptop computers, tablet computers, personal digital assistants (PDAs), smart phones and other telephony devices. Client devices 108, 110 may be configured with computer hardware, computer software, or any combination of computer hardware and computer software to perform the functionality described herein. According to one embodiment, client device 108 includes a presenter application 126, a videoconferencing composer application 128 and a collaboration client 130. The presenter application 126 allows a user of client device 108 to manage electronic information collaboration on electronic whiteboards 102, 104, projector 106 and client device 110. One non-limiting example implementation of the presenter application 126 is a Tamago Presenter from Ricoh Company Limited. The videoconferencing composer application 128 allows users of client device 108 to easily establish videoconferencing sessions between videoconferencing sites. The collaboration client 130, in conjunction with collaboration server 114, enables additional functionality to be performed with respect to electronic information displayed on client device 108. Client device 110 may also include a collaboration client 132. The presenter application 126, videoconferencing composer application 128 and collaboration client 130 are described in more detail hereinafter.

Virtual projector 112 is an intermediary entity, device, process, etc., that allows electronic information to be displayed on electronic whiteboards 102, 104, projector 106 and client devices 108, 110, or any combination thereof. The electronic information may include electronic information that originates from one or more sources and the virtual projector 112 allows the electronic information to be displayed on one or more display devices in one or more formats. The virtual projector 112 is able to emulate the functionality of a display device to allow a client device, such as client device 108, to interact with the virtual projector 112 in the same way that the client device 108 would interact with an end display device, such as electronic whiteboards 102, 104 or projector 106.

Virtual projector 112 may be implemented using a wide variety of computer hardware, computer software, or combination of computer hardware and computer software and the approaches described herein are not limited to virtual projector 112 being limited to any particular implementation. According to one embodiment, virtual projector 112 includes a device discovery module 134, a PJLink command handler 136, a Web server 138, a projection application 140 and storage 142. Storage 142 may be implemented by any type of storage and embodiments are not limited to any type of storage. Examples of storage 142 include, without limitation, volatile storage, such as volatile memory and non-volatile storage, such as non-volatile memory, hard disk storage, etc.

The device discovery module 134 discovers end display devices, such as electronic whiteboards 102, 104, projector 106 and client device 110, that are available to display electronic information. Device discovery module 134 may use a wide variety of approaches to discover available display devices, depending upon a particular implementation, and the approaches described herein are not limited to device discovery module 134 using any particular discovery approach. Device discovery module 134 may include capabilities to discover SNMP display devices and non-SNMP display devices. Example discovery protocols include, without limitation, Simple Network Management Protocol (SNMP), Windows Management Instrumentation (WMI), Internet Control Message Protocol (ICMP), Telnet and Web Services discovery for Web Services-enabled devices. Device discovery module 134 may generate and maintain display device data 144 that contains information about available display devices, such as electronic whiteboards 102, 104, projector 106 and client devices 108, 110. Example information includes, without limitation, IP address information and capabilities data that indicates the capabilities of each display device.

According to one embodiment, device discovery module 134 is configured to process and provide responses to discovery requests received from client devices, in a manner that a display device would itself process and respond to discovery requests. For example, suppose that client device 108 generates broadcasts an SNMP GET Request message over network 118. Virtual projector 112 processes the SNMP GET Request message and provides an SNMP GET Response message to client device 108, where the SNMP GET Response message includes identification information, such as a Name and IP address, for the virtual projector 112.

The PJLink command handler 136 is a command handler that processes display device commands received from one or more client devices and processes the display device commands as they would normally be processed by a display device that supports the PJLink specification. This allows electronic information to be displayed on display devices that do not support the PJLink specification. For example, in response to the virtual projector 112 receiving a PJLink power status query in the form of a POWR? command, the PJLink command handler 136 provides a response indicating that the power is on. As another example, in response to the virtual projector 112 receiving a PJLink projector name query in the form of a NAME? command, the PJLink command handler 136 provides a response specifying the name of the virtual projector 112. As yet another example, in response to the virtual projector 112 receiving a PJLink input switch query in the form of an INPT? command, the PJLink command handler 136 provides a response indicating that the input source is the network. The PJLink command handler 136 may support all of the commands described in the PJLink specification, or a subset of those commands, depending upon a particular implementation, and embodiments are not limited to a command handler that necessarily supports all of the commands described in the PJLink specification. Embodiments are described herein in the context of PJLink command handler 136 supporting the PJLink protocol for purposes of explanation, but embodiments are not limited to the PJLink protocol and the virtual projector 112 may be configured to support other display device command interfaces, depending upon a particular implementation.

The projection application 140 is a Web application that is configured to process http and other requests from client devices and, in conjunction with the other elements on virtual projector 112, cause the electronic information to be displayed on display devices. For example, the projection application 140 may process a request from presenter application 126 and cause electronic information to be both displayed on electronic whiteboards 102, 104 or projector 106, and made available to client device 110 via Web server 138. This is just one example and other examples are described hereinafter. The particular implementation of projection application 140 may vary and the approaches described herein are not limited to any particular implementation of projection application 140. One non-limiting example implementation of projection application 140 is an HTTP Web server that provides a Java execution environment. For example, projection application 140 may be implemented as a Tomcat server that implements the Java servlet and Java ServerPages (JSP) specifications from Oracle Corporation. According to one embodiment, projection application 140 includes Servlets for processing HTTP POST and HTTP PUT requests. The first Servlet (ProjectionServlet) processes HTTP POST requests (http://<ipaddress>:80/service/projection) and returns a response with "Status: 201 Created and Location http://<ipaddress>:80/service/data/". The second Servlet (CbsServlet) processes PUT requests http://<ipaddress>:80/service/data and saves the data as electronic information 146 in storage 142. Example XML implementations of the ProjectionServlet and CbsServlet are as follows:

```
ProjectionServlet.java:
package com.ricoh.cbs;
import java.io.IOException;
import javax.servlet.ServletException;
import javax.servlet.http.HttpServlet;
import javax.servlet.http.HttpServletRequest;
import javax.servlet.http.HttpServletResponse;
import org.apache.log4j.Logger;
public class ProjectionServlet extends HttpServlet {
    private static final long serialVersionUID = 5146070876053747799L;
    private static final Logger LOGGER =
Logger.getLogger(ProjectionServlet.class);
    private static final String CBS_SERVLET_CONTEXTPATH = "data";
    private static int counter = 0;
    public ProjectionServlet( ) {
        super( );
    }
    protected void doGet(HttpServletRequest request, HttpServletResponse response)
            throws ServletException, IOException {
```

```
                LOGGER.info("doGet( )");
                doPost(request, response);
        }
        protected void doPost(HttpServletRequest request, HttpServletResponse
response)
                throws ServletException, IOException {
                LOGGER.info("doPost( )");
                response.setContentType("text/plain");
                String contextPath = request.getContextPath( );
                String requestUrl = request.getRequestURL( ).toString( );
                String appContextPath =
requestUrl.substring(0,requestUrl.indexOf(contextPath)
                        + contextPath.length( ) + 1);
                counter = (counter > 100 ? 0 : counter); // reset counter value.
                StringBuffer location = new StringBuffer( );
                location.append(appContextPath);
                location.append(CBS_SERVLET_CONTEXTPATH);
                location.append('/');
                // location.append(counter++);
                LOGGER.info("location:" + location.toString( ));
                response.setHeader("Location", location.toString( ));
                response.setStatus(HttpServletResponse.SC_CREATED);
        }
        protected void doPut(HttpServletRequest request, HttpServletResponse response)
                throws ServletException, IOException {
                LOGGER.info("doPut( )");
                throw new UnsupportedOperationException("Put operation is not
supported!");
        }
}
CbsServlet.java:
package com.ricoh.cbs;
import java.io.File;
import java.io.FileOutputStream;
import java.io.IOException;
import java.io.InputStream;
import javax.servlet.ServletException;
import javax.servlet.http.HttpServlet;
import javax.servlet.http.HttpServletRequest;
import javax.servlet.http.HttpServletResponse;
import org.apache.log4j.Logger;
public class CbsServlet extends HttpServlet {
        private static final long serialVersionUID = -3527154329355510731L;
        private static final Logger LOGGER = Logger.getLogger(CbsServlet.class);
        private static final String UPLOAD_FOLDER = "upload";
        private static String FILE_SPARATOR = SystemgetProperty("file.separator");
        private static int counter = 0;
        private static int maxCounter = 20;
        public CbsServlet( ) {
                super( );
        }
        protected void doGet(HttpServletRequest request, HttpServletResponse response)
                throws ServletException, IOException {
                LOGGER.info("doGet( )");
                throw new UnsupportedOperationException("Get operation is not
supported!");
        }
        protected void doPost(HttpServletRequest request, HttpServletResponse
response)
                throws ServletException, IOException {
                LOGGER.info("doPost( )");
                throw new UnsupportedOperationException("Post operation is not
supported!");
        }
        protected void doPut(HttpServletRequest request, HttpServletResponse response)
                throws ServletException, IOException {
                LOGGER.info("doPut( )");
                String contentType = request.getContentType( );
                LOGGER.info("contentType:" + contentType);
                if (contentType.equalsIgnoreCase("image/jpeg")) {
                        saveImage(request);
                } else {
                        LOGGER.error("Unsupported content type:" + contentType);
                }
        }
        private void saveImage(HttpServletRequest request) {
                LOGGER.info("SaveImage( )");
                counter = (counter > maxCounter ? 0 : counter);
                String uploadFolderFullPath = createUploadFolder(request);
```

```
        String imageName = (counter++) + ".jpeg";
        String fileFullPath = uploadFolderFullPath + imageName;
        LOGGER.info("fileFullPath:" + fileFullPath);
        InputStream inputStream = null;
        FileOutputStream outputStream = null;
        try{
            inputStream = request.getInputStream( );
            outputStream = new FileOutputStream(fileFullPath, false);
            int contentLength = request.getContentLength( );
            byte[ ] tmpdata = new byte[1024];
            int readLen = -1;
            int total = 0;
            readLen = inputStream.read(tmpdata);
            while (total < contentLength) {
                outputStream.write(tmpdata, 0, readLen);
                total += readLen;
                readLen = inputStream.read(tmpdata);
            }
            String contextPath = request.getContextPath( );
            String requestUrl = request.getRequestURL( ).toString( );
            String rootUrl = requestUrl.substring(0,
                    requestUrl.indexOf(contextPath) +
contextPath.length( ));
            String imageUrl = rootUrl + "/" + UPLOAD_FOLDER + "/" +
imageName;
            ContentData.setImageUrl(imageUrl);
            LOGGER.info("imageUrl:" + imageUrl);
        } catch (Exception e) {
            LOGGER.error("Error occured when calling SaveImage( ).", e);
        } finally {
            try{
                if (inputStream != null) {
                    inputStream.close( );
                }
                if (outputStream != null) {
                    outputStream.flush( );
                    outputStream.close( );
                }
            } catch (Exception e) {
                LOGGER.error("Error occured while closing
inputStream/outputStream", e);
            }
        }
    }
    private String createUploadFolder(HttpServletRequest request) {
        String contextPath =
request.getSession( ).getServletContext( ).getRealPath("/");
        String uploadFolderFullPath = contextPath + PILE_SPARATOR +
UPLOAD_FOLDER + FILE_SPARATOR;
        LOGGER.info("uploadFolderFullPath:" + uploadFolderFullPath);
        try {
            File file = new File(uploadFolderFullPath);
            if (!file.exists( )) {
                file.mkdirs( );
            }
        } catch (Exception ex) {
            LOGGER.error("Error occured while create folder:" +
UPLOAD_FOLDER);
        }
        return uploadFolderFullPath;
    }
}
Index.jsp:
<%@page import="com.ricoh.cbs.ContentData"%>
<html>
<head>
<meta http-equiv="Cache-Control" content="cache">
<meta http-equiv="Pragma" content="cache">
<meta http-equiv="Expires" content="0">
<meta http-equiv="Content-Type" content="text/html; charset=UTF-8">
<title>Virtual Projector</title>
<script type="text/javascript">
    function reFresh( ){
        //reload current page from server.
        location.reload(true);
    }
    //refresh page in 1000 milliseconds.
    window.setInterval("reFresh( )", 1000);
```

-continued

```
    </script>
  </head>
  <body >
      <%
        String imageUrl = ContentData.getImageUrl( );
        imageUrl = (null == imageUrl ? "" : imageUrl);
        //out.println("imageUrl:" + imageUrl);
        if (imageUrl.length( ) > 0) {
      %>
        <img src="<%=imageUrl %>">
      <%
        }
      %>
  </body>
</html>
```

Electronic information may be stored as electronic information 146 on storage 142 and may be formatted in different formats, depending upon a particular implementation. Web server 138 hosts Web pages that directly, indirectly, for example via links, or both directly and indirectly, contain electronic information. The Web pages are provided to end display devices and when processed, provide for the display of the electronic information. Each of the aforementioned elements of the virtual projector 112 is described in more detail hereinafter.

Collaboration server 114 includes a collaboration manager 148 that operates in conjunction with the collaboration clients 120, 122, 124, 130, 132 to allow users to collaborate on electronic information. Content server 116 may be implemented as any type of network element that stores and makes available electronic content 150. Examples of content server 116 include, without limitation, an origin server, a Web server, a data repository and a data storage device.

Figure 3A:
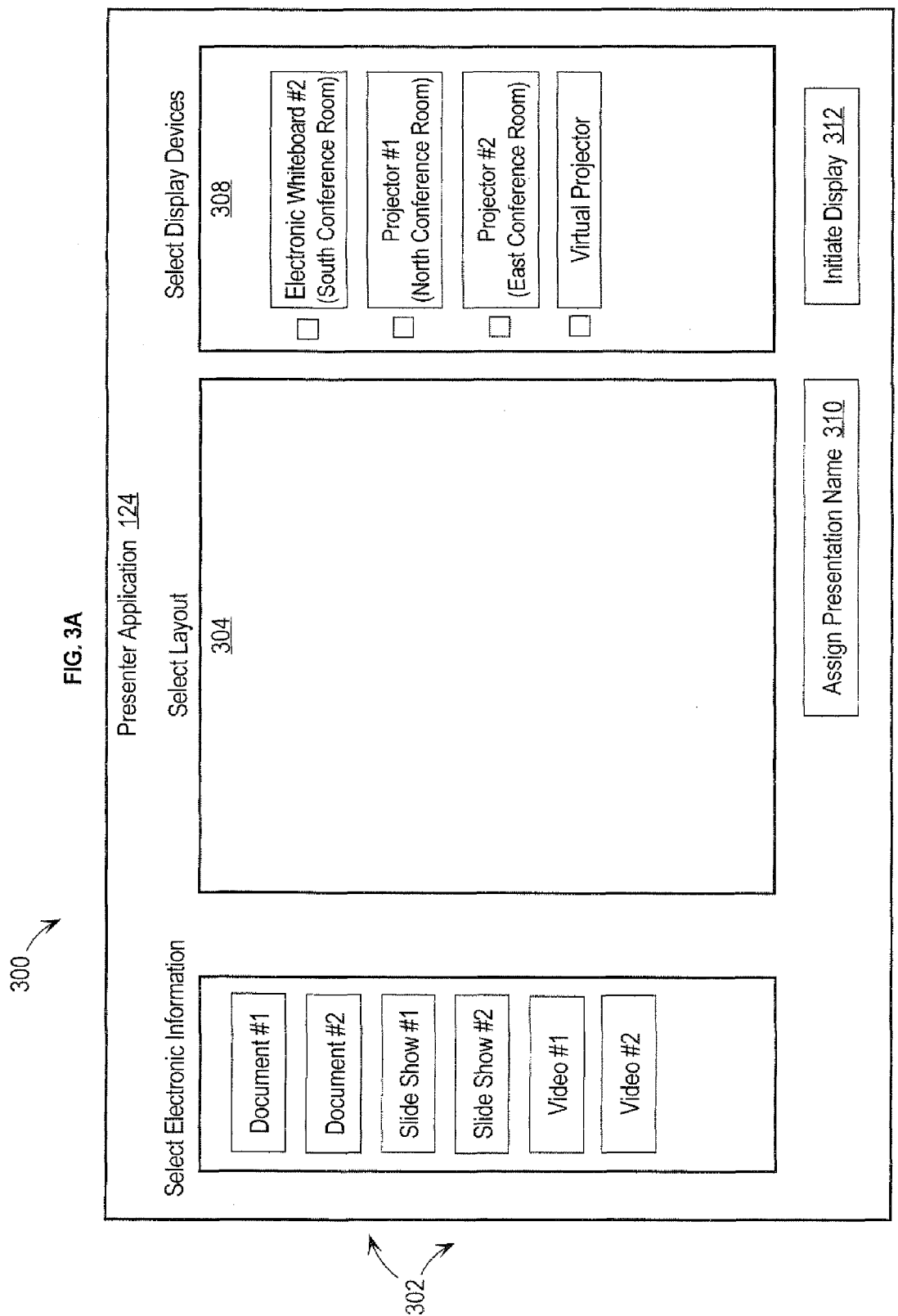
FIG. 3A is a block diagram that depicts an example embodiment of mobile device 104.

III. Displaying Electronic Information on Multiple Display Devices Using a Virtual Projector FIG. 2 is a flow diagram 200 that depicts an approach for electronic information collaboration according to an embodiment. In step 202, a request is received to display electronic information on a display device and to make the electronic information available via a virtual projector. For example, projection application 140 may receive a request from presenter application 126 on client device 108. The request may be generated in a wide variety of ways, depending upon a particular implementation. For example, FIG. 3A depicts an example graphical user interface 300 generated by presenter application 126. The graphical user interface 300 allows a user to select electronic information to be displayed on selected display devices. In the present example, graphical user interface 300 includes graphical user interface objects 302 that correspond to different electronic information items that may be selected for display on selected display devices. The corresponding electronic information items are "Document #1", "Document #2", "Slide Show #1", "Slide Show #2", "Video #1" and "Video #2". The graphical user interface 300 may also include user interface objects that allow a user to navigate to and locate electronic information to be selected for display. The electronic information may reside at any location. For example, the electronic information may reside on client devices 108, 110, on virtual projector 112, on content server 116, or at other locations. Thus, the electronic information shared among users according to the approaches described herein may include electronic information items that originate from different sources. The approaches described herein are applicable to any type of electronic information and are not limited to the examples of electronic information depicted in the figures and described herein. For example, the approaches are applicable to any type of electronic documents, audio/video content, streaming content or any other types of content feeds.

According to one embodiment, graphical user interface 300 allows a user to specify access attributes for any of the electronic information items selected for display. A set of user interface controls 306 allow a user to select a read only, read/write or policy access to be applied to "Document #1". Selection of the read only access option, when properly enforced by a display device, will prohibit any changes being made to "Document #1" while displayed on a display device. Selection of the read/write access option, when properly enforced by a display device, will allow any changes to be made to "Document #1" while displayed on a display device. Selection of the policy access option allows an access policy to be applied to "Document #1" while displayed on a display device.

Figure 3B:
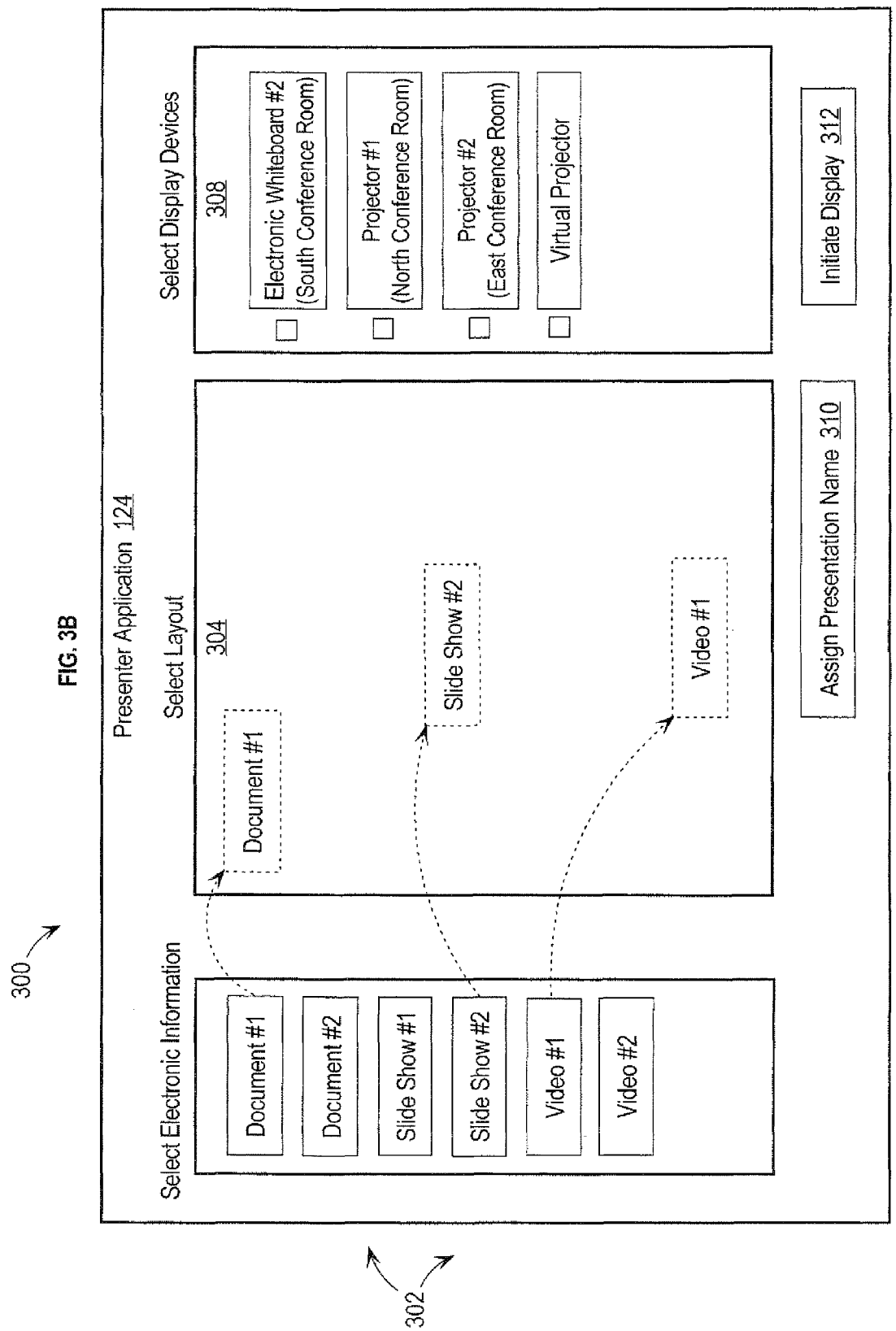
FIG. 3B depicts an example graphical user interface screen generated and displayed on screen/touchpad by videoconferencing composer application.

According to one embodiment, graphical user interface 300 allows a user to select a layout, e.g., location, of the selected electronic information on the selected display devices. This may be accomplished using a wide variety of techniques, depending upon a particular implementation, and the particular techniques depicted in the figures and described here are provided as non-limiting examples. In the present example, as depicted in FIG. 3B, graphical user interface 300 allows a user to drag and drop one or more of the user interface objects 302 onto a display area 304. In this example the user would like to display Document #1, Slide Show #2 and Video #1 on one or more display devices. FIG. 3B depicts that the user has selected and moved the graphical user interface objects corresponding to the "Document #1", "Slide Show #2" and "Video #1" electronic information items onto display area 304. According to one embodiment, the locations of the graphical user interface objects on the display area 304 corresponds to the locations where the corresponding electronic information items will be displayed on the selected display devices. For example, when displayed on a display device, "Document #1" will be displayed in the upper left corner of the display, "Slide Show #2" will be displayed in the center of the display and "Video #1" will be displayed in the lower center of the display.

Figure 3C:
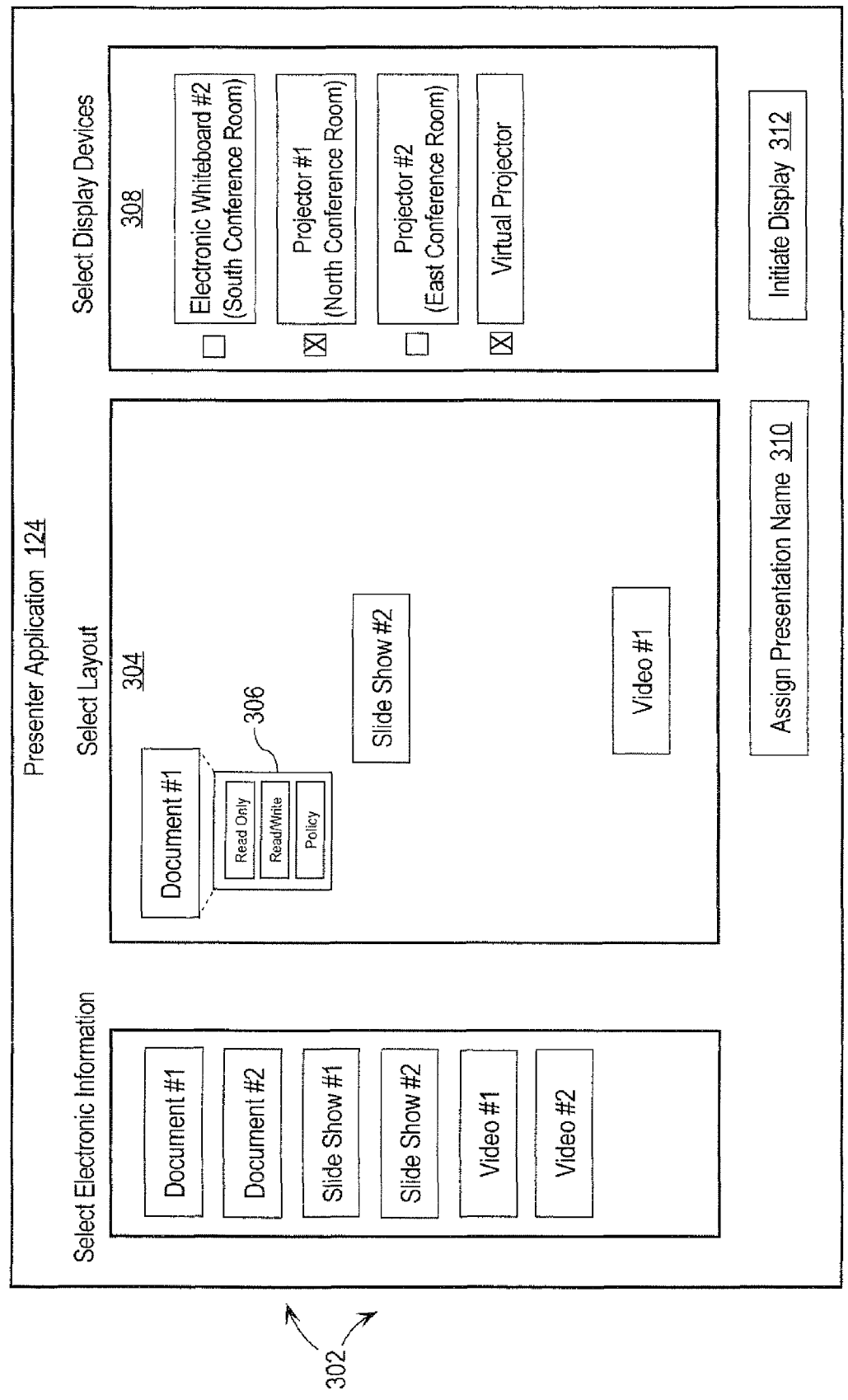
FIG. 3C depicts videoconferencing composer application with a box that shows the active videoconferencing sessions.

As depicted in FIG. 3C, the graphical user interface 300 includes a set of graphical user interface objects in area 306 that allows a user to select display devices on which the selected electronic information is to be displayed. The graphical user interface objects correspond to physical display devices named "Electronic Whiteboard #2", "Projector #1" and "Projector #2". The available physical display devices may be obtained from virtual projector 112. For example, the presenter application 126 may query the device discovery module 134 for data that identifies the available display devices. In response to this query, the device discovery module 134 may provide data from the display device data 144 to enable the presenter application 126 to display the available display devices. The "Virtual Projector" display device corresponds to virtual projector 112 and the selection of the graphical user interface object that corresponds to the "Virtual Projector" display device makes the selected electronic information items available to be accessed via the Web server 138 of the virtual projector 112, as described in more detail hereinafter. In the present example, a user has used a selection device, such as a mouse or stylus, to select graphical user interface objects that correspond to the "Projector #1" and "Virtual Projector" display devices. A user may select any number of display devices and may include read-only display devices, read/write display devices, or any combination of read-only and read/write display devices.

A user may select an "Assign Presentation Name" button 310 that allows a user to assign a name or identifier to the presentation of electronic information designed by the user. As described in more detail hereinafter, the assignment of a name allows client devices to select and view presentations, by name, from the virtual projector. The Selection of an "Initiate Display" graphical user interface object, in the form of a button 312, causes the presenter application to generate and transmit a request to the projection application 140 on virtual projector 112. The request identifies the electronic information to be displayed, any access policies to be applied to any electronic information items within the electronic information and the display devices on which the electronic information is to be displayed, or made available, in the case of the virtual projector. For example, the request may include the electronic information in the request itself or as an attachment. As another example, the request may specify a location of the electronic information. The projection application 140 may retrieve and store the electronic information on the virtual projector 112 as electronic information 146 on storage 142. The request may also include data that indicates the relative positions of the graphical user interface objects placed onto the display area 304. The request may include an http POST command that is processed to create a location on storage 142 for storing the electronic information 146, followed by an http PUT command to store the electronic information 146 at the created location.

In step 204, the electronic information is transmitted to the display devices specified in the request. For example, the projection application 140 may transmit the electronic information 146 to the display devices specified in the request. In the present example, the projection application 140 transmits the electronic information 146 to Projector #1. Other information may also be transmitted with the electronic information, for example data that indicates any access policies to be applied to any electronic information items within the electronic information or location data that indicates locations (absolute or relative) where information items in the electronic information are to be displayed on a display device. The electronic information may be transmitted to the display devices according to protocols supported by the participating entities. For example, electronic information may be transmitted from presenter application 126 or projection application 140 using HTTP or HTTPS.

In step 206, a determination is made whether the request specified the virtual projector as a display device. If not, then the process is complete in step 208. If the request does specify the virtual projector as a display device, then in step 210, the electronic information is made available to client devices via virtual projector 112. This may include, for example, generating one or more Web pages which, when processed, cause the display of the electronic information. The one or more Web pages may be generated by Web server 138, projection application 140, or any other process configured to generate Web pages. The one or more Web pages may directly include part or all of the electronic information or may include links to retrieve part or all of the electronic information. For example, a Web page may include a link to an electronic information item stored in electronic information 150 on content server. The processing of the Web page and link at a display device or a client device causes the one or more electronic information items referenced in the link to be retrieved and displayed. When the electronic information includes multiple electronic information data items, various techniques, such as frames, flash video, etc., may be employed to provide for the display of the electronic information. The one or more Web pages may be stored as electronic information 146 on storage 142 of virtual projector 112.

In step 212, one or more requests are received for the electronic information from the virtual projector. Client devices may be provided access to the one or more Web pages stored on virtual projector 112. FIG. 4 depicts an example graphical user interface 400 provided by the Web server 138 of virtual projector 112. An application on a client device accesses the graphical user interface 400 by requesting a Web page at a particular URL. Alternatively, a user may enter an address into a Web browser, such as http://www.companyabc.com/virtualprojector/presentations to access the graphical user interface 400. In the present example, the graphical user interface 400 allows a user to select a graphical user interface object that corresponds to a presentation, such as "Presentation #1", "Presentation #2" or "Presentation #3". The user may then select a "View Presentation" button 402 and in step 214, the one or more Web pages for the selected presentation are served to the client device. In step 216, the electronic information is displayed. For example, processing on a client device of the one or more Web pages for the selected presentation cause the electronic information to be displayed on the client device. Although embodiments are described herein in the context of client devices requesting to access a presentation from virtual projector 112, the approaches described herein are not limited to this context and display devices may also request presentations from virtual projector 112. For example, a display device, such as electronic whiteboards 102, 104 or projector 106 may include corresponding computer hardware or software, e.g., a personal computer or other hardware attached to the display device, to allow a user to access the virtual projector 112 in the same manner as a user of client device 110.

The use of a virtual projector as described herein provides a user-friendly approach for allowing users of different display devices to simultaneously view the same electronic information. For example, a first group of users may view the electronic information on an electronic whiteboard while other users view the same electronic information on another electronic whiteboard or on other client devices, such as a smart phone or tablet computer. The client devices do not have to include any special purpose hardware or software. Rather, all that is required is a generic Web browser or other application capable of processing and displaying Web pages. The electronic information viewed by the users may contain electronic information items that originate from different sources. For example, referring to FIGS. 3A-3C, "Document #1" may originate from client device 108 and "Slide Show #2" and "Video #1" may originate from a different source, e.g., a server. The format of the electronic information may vary from display device to display device. For example, the electronic information may be displayed on one display device in an editable format while the electronic information may be displayed on another display device in a read-only format. This may be useful, for example, in situations where a business entity would like to display confidential electronic information in a read-only format on a client device that is external to the business entity, but allow users to edit the electronic information on display devices located within a secure location of the business entity. The format of electronic information items within shared electronic information may also vary. For example, electronic information may include a video that is non-editable and a document for collaboration notes that is editable. As another example, electronic information may include an electronic document that is displayed in a non-editable form that serves as an original electronic document and a copy of the electronic document in an editable form that serves as a working copy of the electronic document. This allows users to view, but not edit, the original document and provide comments on the working copy that is in editable form.

According to one embodiment, virtual projector 112 is configured to record content shared between entities. For example, the Web server 138 may be configured to record content shared with display devices. The Web server 138 may provide a graphical user interface for viewing recorded content, which may require user authentication, depending upon a particular implementation. According to another embodiment, client devices or display devices may be configured to locally record electronic information that they receive.

FIG. 5 is a diagram 500 that depicts an exchange of messages between elements of an arrangement that provides for the display of electronic information on multiple display devices using a virtual projector. Client device 108 generates and transmits a display request 502 to virtual projector 112. The display request may be generated, for example, in the manner previously depicted and described herein with respect to FIGS. 3A-3C. The virtual projector 112 processes the display request and obtains electronic information items specified in, or accompanying, the request. In the present example, it is presumed that the display request 502 includes a request for an electronic information item that is stored on content server 116. In step 504, the virtual projector 112 requests the electronic information item from content server 116. In step 506, the virtual projector 112 receives the electronic information item from the content server 116.

In step 508, the virtual projector generates one or more Web pages that directly or indirectly include the electronic information specified in the request 502. For example, the one or more Web pages may themselves include electronic information items specified in the request 502. Alternatively, the one or more Web pages may include links to one or more of the electronic information items specified in the request 502. For example, a Web page may contain a link to the electronic information item stored on content server 116.

In step 510, the virtual projector 112 transmits to the projector 106 the electronic information specified in the request 502 and the electronic information is displayed on the projector 106. In step 512, client device 110 transmits to the virtual projector 112 a request for the electronic information. The request may be generated by a user of client device 110 using a graphical user interface, for example of FIG. 4, to request to view a presentation. In step 514, one or more Web pages that correspond to the requested electronic information are transmitted to client device 110. For example, Web server 138 may transmit the requested one or more Web pages to client device 110.

IV. Electronic Information Collaboration Using a Mobile Device

FIG. 6 is a diagram 600 that depicts an exchange of messages between elements of an arrangement that provides for electronic information collaboration from a mobile device. In step 602, client device 108, which in the present example is a mobile device, generates and transmits a display request to collaboration manager 148 on collaboration server 114. The display request may be generated, for example, in the manner previously depicted and described herein with respect to FIGS. 3A-3C. The collaboration manager 148 processes the request and obtains electronic information items specified in, or accompanying, the request. It the present example, it is presumed that the display request 602 includes a request for an electronic information item that is stored on content server 116. In step 604, the collaboration manager 148 requests the electronic information item from content server 116. In step 606, the collaboration manager 148 receives the requested electronic information item from the content server 116.

In step 608, the collaboration manager 148 transmits the electronic information to the projector 106. In step 610, the collaboration manager 148 generates and transmits a request for a videoconferencing session to both the client device 108 and the projector 106. Note that steps 608 and 610 may be performed together in a single step or step 610 may be performed prior to step 608, depending upon a particular implementation. The establishment of a videoconferencing session between client device 108 and projector 106 allows users of the client device 108 and the projector 106 to collaborate on electronic information that is displayed both at the client device 108 and the projector 106.

In step 610, the collaboration manager 148 receives change data 612 from the projector 106. The change data indicates a change made to the copy of the electronic information displayed on the projector 106. For example, a user may use a stylus, mouse or other pointing/selection device to annotate the electronic information displayed at the projector 106. In this example, the change data 612 indicates the annotations made by the user to the electronic information at the projector 106. In step 614, the collaboration manager 148 transmits change data 614 to the client device 108. The change data 614, when processed by the collaboration client 132 at client device 108, causes the annotations made to the electronic information at the projector 106 to be propagated to the client device 108 so that one or more users of client device 108 can view the changes to the electronic data made at the projector 106. Changes made to the electronic data displayed at client device 108 may similarly be propagated to the projector 106 so that users of the projector 106 can view the changes may to the electronic data by users of the client device 108.

V. Videoconferencing Site Map Architecture

Figure 7:
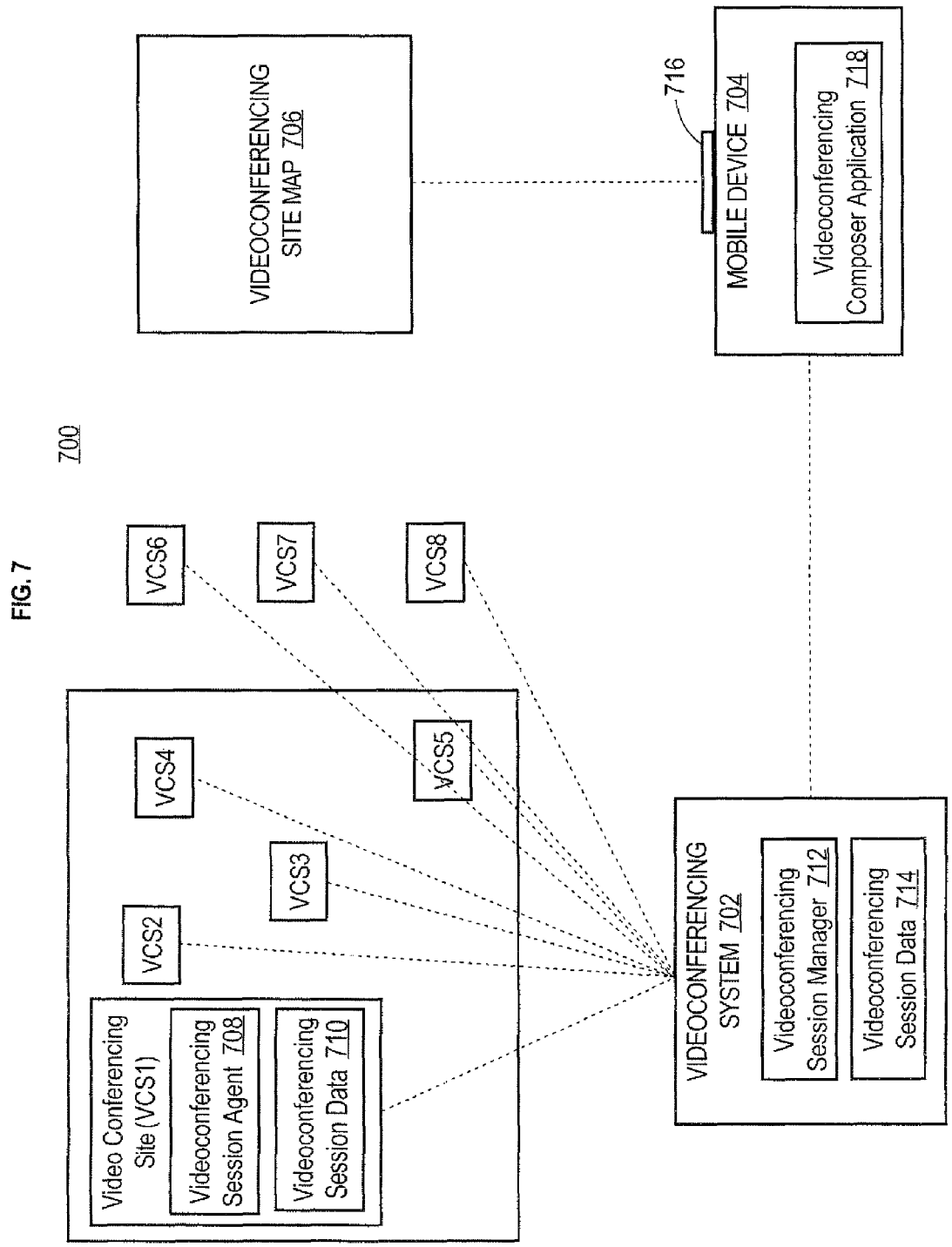
FIG. 7 is a block diagram that depicts a videoconferencing arrangement.

FIG. 7 is a block diagram that depicts a videoconferencing arrangement 700. Videoconferencing arrangement 700 includes video conferencing sites that are identified in FIG. 7 as videoconferencing site (VCS1) and VCS2-VCS8, a videoconferencing system 702, a mobile device 704 and a videoconferencing site map 706.

Videoconferencing sites VCS1-VCS8 each include computer hardware, computer software and other equipment that makes videoconferencing available to one or more users at a location that corresponds to the site. The approaches described herein are not limited to videoconferencing sites VCS1-VCS8 having any particular computer hardware, computer software and other equipment configuration. For example, videoconferencing sites VCS1-VCS8 may include a computing device, such as a personal computer, tablet computer or mobile device that has network connectivity, a camera, microphone, speaker and computer software that supports videoconferencing sessions. As another example, videoconferencing sites VCS1-VCS8 may include special purpose computer hardware, computer software and equipment. According to one embodiment, videoconferencing site VCS1 includes a videoconferencing session agent 708 that is configured to perform one or more actions with respect to one or more videoconferencing sessions with one or more other videoconferencing sites in response to commands received from the videoconferencing system 702. For example, videoconferencing session agent 708 may be configured to initiate and terminate videoconferencing sessions between videoconferencing site VCS1 and one or more other videoconferencing sites in response to commands received from the videoconferencing system 702. Videoconferencing site VCS1 may also maintain videoconferencing session data 710 for one or more videoconferencing sessions in which videoconferencing site VCS1 is a participant. The videoconferencing session data 710 may include a wide variety of data, depending upon a particular implementation. For example, the videoconferencing session data 710 may indicate, for each videoconferencing session, identification data that identifies the videoconferencing session, the videoconferencing sites participating in the videoconferencing session as well as performance and quality metrics for the videoconferencing session and the users participating in the videoconferencing session. The videoconferencing session data 710 may be stored locally on each videoconferencing site or may be stored remotely, depending upon a particular implementation. The other videoconferencing sites VCS2-VCS8 may also include a videoconferencing agent and videoconferencing session data, depending upon a particular implementation.

Videoconferencing sites VCS1-VCS8 do not necessary include the same computer hardware, computer software and equipment and the computer hardware, computer software and equipment at each videoconferencing site VCS1-VCS8 may vary, depending upon a particular implementation. Each videoconferencing site VCS1-VCS8 is configured to communicate with one or more of the other videoconferencing sites VCS1-VCS8 and the videoconferencing system 702, for example, via one or more communications links or networks that may include the Internet.

Videoconferencing sites VCS1-VCS8 may be co-located in the same physical location or located in physically-disparate locations, depending upon a particular implementation, and the approach described herein is not limited to videoconferencing sites VCS1-VCS8 being in any particular physical location. In the example videoconferencing arrangement 700 depicted in FIG. 7, videoconferencing sites VCS1-VCS5 are considered to be co-located with a building and videoconferencing sites VCS6-VCS8 are located at other separate locations. For example, videoconferencing sites VCS1-VCS5 may be located within a building of a business enterprise and videoconferencing sites VCS6-VCS8 may be located in other offices of the business enterprise, or in offices of other business enterprises, customers, suppliers, etc.

Videoconferencing system 702 is configured to establish videoconferencing sessions between two or more of the videoconferencing sites VCS1-VCS8 in response to a request from the mobile device 704. Although embodiments are described herein in the context of videoconferencing sessions for purposes of explanation, the approaches described herein are applicable to a wide variety of connections. Example connections include, without limitation, voice connections, data connections, videoconferencing sessions and shared whiteboard sessions. The request includes videoconferencing site identification data for the participating videoconferencing sites. For example, videoconferencing system 702 may receive from mobile device 704 a request to establish a videoconferencing session between videoconferencing sites VCS1 and VCS6. The request includes videoconferencing site identification data for videoconferencing sites VCS1 and VCS6, for example, an IP address of videoconferencing sites VCS1 and VCS6. The request may also include data that indicates the type of connection to be established. For example, the request may specify whether the connection is to be a voice connection, a data connection, a videoconferencing session, a shared whiteboard session, etc. In response to receiving the request, videoconferencing system 702 establishes a videoconferencing session between videoconferencing sites VCS1 and VCS6. This may be accomplished, for example, by videoconferencing system 702 transmitting commands to processes or special purpose hardware on videoconferencing sites VCS1 and VCS6. Once a videoconferencing session has been established between videoconferencing sites, the videoconferencing system 702 may actively manage the videoconferencing session. For example, videoconferencing system 702 may be configured to use the Session Initiation Protocol (SIP) to manage videoconferencing sessions.

According to one embodiment, the videoconferencing system 702 includes a videoconferencing session manager 712 and videoconferencing session data 716. The videoconferencing session manager 712 is configured to perform one or more actions with respect to one or more videoconferencing sessions. For example, videoconferencing session manager 712 is configured to, for example using the SIP, initiate, terminate and in other ways manage videoconferencing sessions between videoconferencing sites in response to commands received from the mobile device 704. Videoconferencing session data 716 includes data about one or more prior or current videoconferencing sessions. The videoconferencing session data 716 may include a wide variety of data, depending upon a particular implementation. For example, the videoconferencing session data 716 may indicate, for each videoconferencing session, identification data that identifies the videoconferencing session, the videoconferencing sites participating in the videoconferencing session as well as performance and quality metrics for the videoconferencing session and the users participating in the videoconferencing session. The videoconferencing session data 716 may be stored locally on the videoconferencing system 702 or may be stored remotely, depending upon a particular implementation. Videoconferencing system 702 is depicted in FIG. 7 as being a separate entity for explanation purposes only. Videoconferencing system 702 may be part of any number of the videoconferencing sites VCS1-VCS8. For example, videoconferencing system 702 may be implemented on one of the videoconferencing sites VCS1-VCS8 to manage videoconferencing sessions and/or may include components distributed across multiple videoconferencing sites VCS1-VCS8.

VI. Videoconferencing Site Maps

Videoconferencing site map 706 provides a visual representation of videoconferencing sites VCS1-VCS8. The videoconferencing site map 706 may be electronically generated and displayed on a graphical user interface of a computing device, for example, a computer monitor, large screen television, projection screen, an electronic whiteboard, etc. Alternatively, the videoconferencing site map 706 may be on a physical medium, for example on paper or poster board. The videoconferencing site map 706 may also be projected on a surface. For example, the videoconferencing site map 706 may be projected by a projection device onto a screen or wall.

The videoconferencing site map 706, also referred to herein as a "locations map", visually depicts the videoconferencing sites VCS1-VCS8 and may include videoconferencing site identification data that identifies the videoconferencing sites VCS1-VCS8. Videoconferencing site identification data for a particular videoconferencing site includes sufficient information for the particular videoconferencing site to participate in any type of connection, for example, a videoconferencing session, and the approaches described herein are not limited to any particular type of videoconferencing site identification data. Videoconferencing site identification data may be based upon attributes of audio/video equipment at a particular videoconferencing site to allow direct connections to the audio/video equipment at the particular videoconferencing site. For example, videoconferencing site identification data may include an Internet Protocol (IP) address, a Media Access Control (MAC) address, a unique identifier or a Uniform Resource Locator (URL) of audio/visual equipment at a particular videoconferencing site. The videoconferencing site identification data for a particular videoconferencing site may include multiple types of data, for example, an IP address and a URL of audio/visual equipment at a particular videoconferencing site. As another alternative, videoconferencing site identification data may be based on other codes that allow connections to the audio/video equipment at the particular videoconferencing site. The other codes may be based in part upon attributes of audio/video equipment at a particular videoconferencing site, combined with other information. As yet another alternative, codes may be created for particular videoconferencing sites that are not necessarily based upon attributes of audio/video equipment at a particular videoconferencing site. For example, a "site" code may be generated an assigned to a particular videoconferencing site and the site code is used to connect to the particular videoconferencing site. The videoconferencing site identification data may be encoded in a symbol or graphic. Example encodings include, without limitation, a QR code, a UPC code, a barcode, a color-differentiated code and a three-dimensional code. The videoconferencing site identification data may also be stored and made available via a RFID tag. The videoconferencing site map 706 may also visually depict absolute or relative locations of the videoconferencing sites VCS1-VCS8. For example, the videoconferencing site map 706 may specify the location of the videoconferencing sites VCS1-VCS8 within a building or may specify an address or GPS coordinates where the videoconferencing sites VCS1-VCS8 are located. The location of videoconferencing sites VCS1-VCS8 may be expressed relative to other videoconferencing sites, such as videoconferencing sites VCS1-VCS8.

FIG. 8A is an example embodiment of videoconferencing site map 706 that depicts a plurality of videoconferencing sites. Videoconferencing site map 706 includes graphical user interface objects in the form of videoconferencing icons 800, 804, 808, 812, 816 that correspond to videoconferencing sites. For example, videoconferencing icon 800 corresponds to a videoconferencing site known as the "West Conference Room" in ABC Company Worldwide Headquarters. Videoconferencing icons 804 and 808 correspond, respectively, to videoconferencing sites "North Conference Room" and "South Conference Room," which are both also located in ABC Company Worldwide Headquarters. Videoconferencing icons 812 and 816 correspond to videoconferencing sites in different locations that the ABC Company Headquarters and more specifically, at the "U.S. Office" and the "European Office," respectively. Videoconferencing site map 706 includes videoconferencing site identification data that identifies the videoconferencing sites 800, 804, 808, 812 and 816. According to one embodiment, the videoconferencing site identification data is depicted on the videoconferencing site map in a form that allows the videoconferencing site identification data to be read, scanned or otherwise captured by a machine or electronic device. In the example videoconferencing site map 706 of FIG. 8, the videoconferencing site identification data is encoded in QR codes 802, 806, 810, 814, 818, but embodiments are not limited to videoconferencing site identification data being encoded in QR codes. The videoconferencing icons 800, 804, 808, 812, 816 and corresponding QR codes 802, 806, 810, 814, 818 may be located on videoconferencing site map 706 in a manner that visually indicates the relative positions of the corresponding videoconferencing sites. For example, the positions of videoconferencing icons 800, 804, 808 on videoconferencing site map 706 may correspond to the actual physical locations of the "West Conference Room", "North Conference Room" and "South Conference Room" videoconferencing sites within the ABS Company Worldwide Headquarters building.

A videoconferencing site map may include other types of information about videoconferencing sites. According to one embodiment, a videoconferencing site map may indicate a current status of one or more of the videoconferencing sites. For example, videoconferencing site map 706 indicates the current status 820 of the "U.S. Office" videoconferencing site and the current status 822 of the "European Office" videoconferencing site. This is helpful in situations when the equipment at a particular videoconferencing site is not currently able to support a videoconferencing session, for example, during maintenance. A change in status of a videoconferencing site may cause a videoconferencing site map to be regenerated. A videoconferencing site map may also indicate the type of videoconferencing equipment or devices available at a particular videoconferencing site.

Videoconferencing site maps may be generated using a variety of techniques, depending upon a particular implementation. For example, videoconferencing site maps may be generated manually using Computer Aided Design (CAD) software. As another alternative, videoconferencing site maps may be automatically generated by a videoconferencing site map generation process.

Figure 8B:
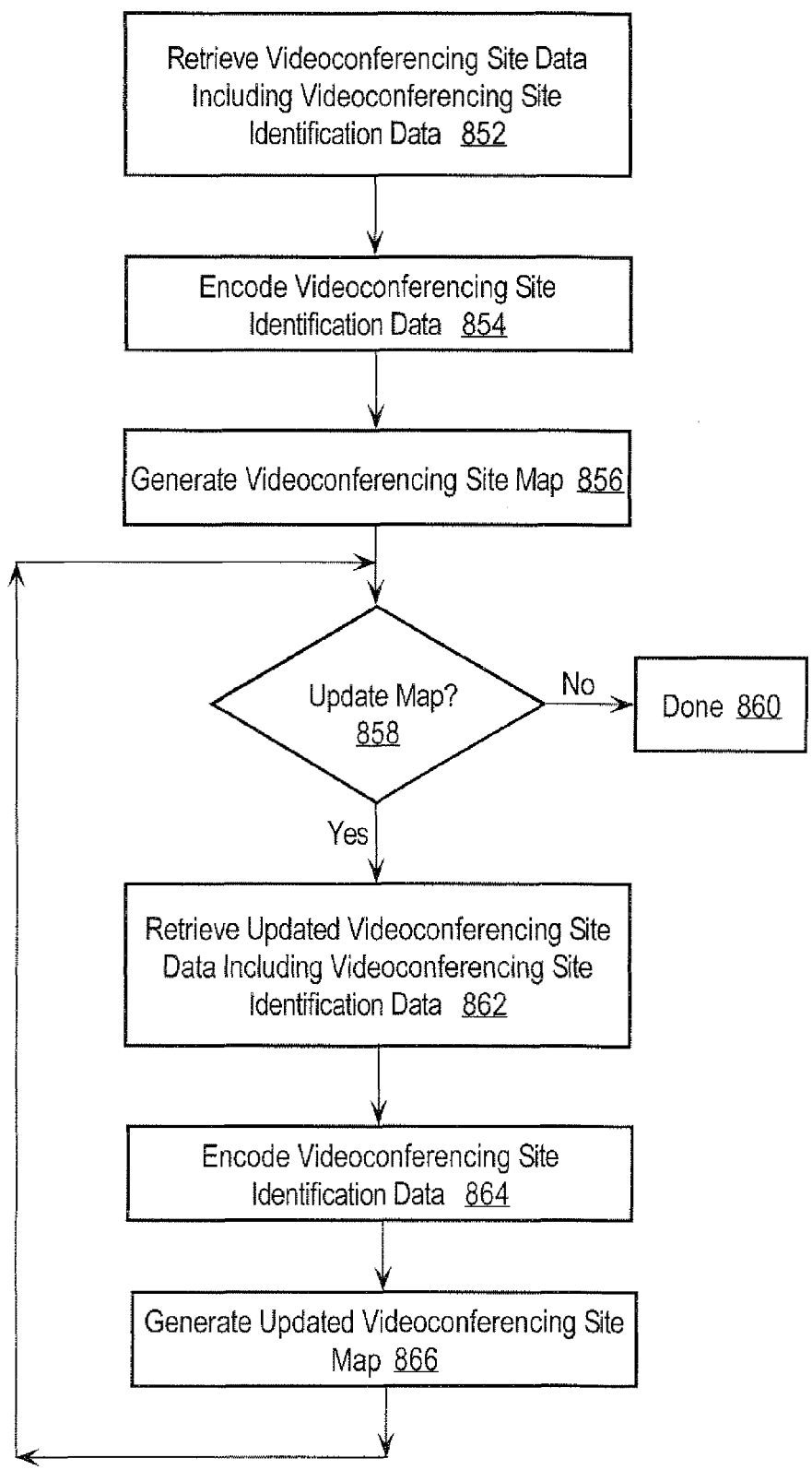
FIG. 8B is a flow diagram that depicts an approach for generating an electronic videoconferencing site map.

FIG. 8B is a flow diagram 850 that depicts an approach for generating an electronic videoconferencing site map. In step 852, videoconferencing site data that includes videoconferencing site identification data is retrieved. For example, a videoconferencing site map generation process may retrieve the videoconferencing site data. The videoconferencing site map generation process may execute, for example, on a network device such as a server. The videoconferencing site data includes videoconferencing site identification data as described herein, and may include other data that describes attributes of two or more videoconferencing sites. For example, the videoconferencing site data may specify a status, location (absolute or relative), type of device, or other description information for the two or more videoconferencing sites represented in the videoconferencing site data to enable the videoconferencing site map generation process to generate a videoconferencing site map 706 as depicted in FIG. 8A. The videoconferencing site identification data may be generated, at least in part, based upon identification data obtained from a machine-readable graphic that corresponds to audio/video equipment at a videoconferencing site. For example, videoconferencing site identification data may be generated based upon identification data obtained by scanning a QR code affixed to or otherwise associated with audio/video equipment at a videoconferencing site. The QR code may be scanned using any type of device capable of scanning QR codes, such as a smart phone, tablet computing device, etc.

In step 854, the videoconferencing site identification data is encoded. For example, the videoconferencing site map generation process may generate a QR code for each videoconferencing site. Each QR code may be represented by QR code data. In step 856, the videoconferencing site map is generated that includes the encoded videoconferencing site identification data. According to one embodiment, this includes generating videoconferencing site map data that represents the videoconferencing site map. Generating the videoconferencing site map may be based upon a scaled or unscaled layout of one or more buildings where the videoconferencing sites are located. As previously described herein, the videoconferencing site map may include location information for the videoconferencing sites represented on the videoconferencing site map. The location of a videoconferencing site may be specified in the videoconferencing site data or the location may not be known and may be determined, for example, via GPS coordinates or based upon the relative position with respect to other videoconferencing sites. Videoconferencing sites may be located on the videoconferencing site map based upon their location. The videoconferencing site map may be scaled and/or oriented depending upon a particular implementation. According to one embodiment, registration data is generated in association with a videoconferencing site map. The registration data may include data that identifies the videoconferencing sites included in the videoconferencing site map, as well as other data about the videoconferencing sites, such as the other videoconferencing site data.

In step 858, a determination is made whether the videoconferencing site map should be updated. For example, the videoconferencing site map generation process may detect that data within the videoconferencing site data has changed and therefore that the current videoconferencing site map may no longer be accurate. For example, a change in the location of a particular videoconferencing site or of audio/video equipment at a particular videoconferencing site may cause a videoconferencing site map to be updated. The change in location may be detected based upon a change in videoconferencing site data. As another example, the videoconferencing system 702 may automatically detect a change in location, for example if the current gps coordinates of particular audio/video equipment no longer match saved gps coordinates for the audio/video equipment. In making this determination, the videoconferencing site map generation process may examine the videoconferencing site data at a particular point in time or over a specified time, depending upon a particular implementation.

If the videoconferencing site map does not need to be updated, then the process is complete in step 860. If in step 858, a determination is made that the videoconferencing site map does need to be updated, then in step 862, updated videoconferencing site data that includes videoconferencing site identification data is retrieved. For example, the videoconferencing site map generation process may retrieve the updated videoconferencing site data. The updated videoconferencing site data indicates a change that has occurred to one or more videoconferencing sites. For example, an existing videoconferencing site may have moved or have had a change made to its name or status, e.g., changing from online to offline, or a new videoconferencing site may have been added. When a change is made for an existing videoconferencing site, then the corresponding encoded videoconferencing site identification data on a videoconferencing site map is no longer accurate and needs to be updated.

In step 864, the videoconferencing site identification data is encoded and in step 866, an updated videoconferencing site map is generated that includes the new encoded videoconferencing site identification data. According to one embodiment, the updating of the videoconferencing site map may include user involvement, for example, by notifying a user about the update and allowing the user to confirm the update before the videoconferencing site map is updated. The new encoded videoconferencing site identification data replaces the prior videoconferencing site identification data of the videoconferencing site for which the data was updated. For example, in context of the encoded videoconferencing site identification data being represented as a QR code, the new QR codes replace the prior QR codes in the updated videoconferencing site map. The registration data may be updated to reflect the updated videoconferencing site map. The process then continues with step 858 and steps 858-866 may be repeated so long as a change in status occurs. According to one embodiment, the process of generating an updated videoconferencing site map may be made in response to a user, for example an administrator, requesting an updated videoconferencing site map. The videoconferencing site map generation process may provide a graphical user interface that allows a user to manage videoconferencing site data and request initial or updated videoconferencing site maps. According to one embodiment, a videoconferencing site map may visually depict that a current videoconferencing session is in progress between videoconferencing sites. For example, in response to determining that a videoconferencing session has been initiated between two videoconferencing sites, the videoconferencing site map generation process generates an updated videoconferencing site map that visually indicates that the videoconferencing session has been initiated between the two videoconferencing sites, e.g., by drawing a labeled line on the videoconferencing site map between the two videoconferencing sites or by highlighting the two videoconferencing sites with a particular color.

VII. Mobile Devices

Mobile device 704 may be any type of mobile device and the approach is not limited to any particular type of mobile device. Examples of mobile device 704 include, without limitation, personal computers, laptop computers, tablet computers, personal digital assistants (PDAs) and telephony devices. According to one embodiment, mobile device 704 includes a data acquisition device that is capable of acquiring videoconferencing site identification data from a videoconferencing site map. A wide variety of data acquisition devices may be used, depending upon a particular implementation, and embodiments are not limited to any particular type of data acquisition devices. Example data acquisition devices include, without limitation, a camera, a scanner for scanning QR codes, barcodes and/or UPC codes and an RFID scanner. For example, mobile device 704 may be configured with a camera that captures, from a videoconferencing map, first image data of a first QR code that corresponds to a first videoconferencing site and second image data of a second QR code that corresponds to a second videoconferencing site. The mobile device 704 may be further configured with computer hardware, computer software, or any combination of computer hardware and computer software to process the first and second image data to obtain from the first and second image data the videoconferencing site identification data for the first and second videoconferencing sites. The mobile device 704 transmits the videoconferencing site identification data for the first and second videoconferencing sites to the videoconferencing system 702 to establish a videoconferencing session between the first and second videoconferencing sites. Mobile device 704 may be configured with any number of the aforementioned data acquisition devices and may be configured with other types of data acquisition devices, depending upon a particular implementation. According to one embodiment, mobile device 704 is configured with a data acquisition device 718 and a videoconferencing composer application 720 that allow users to easily establish videoconferencing sessions between videoconferencing sites.

Figure 9A:
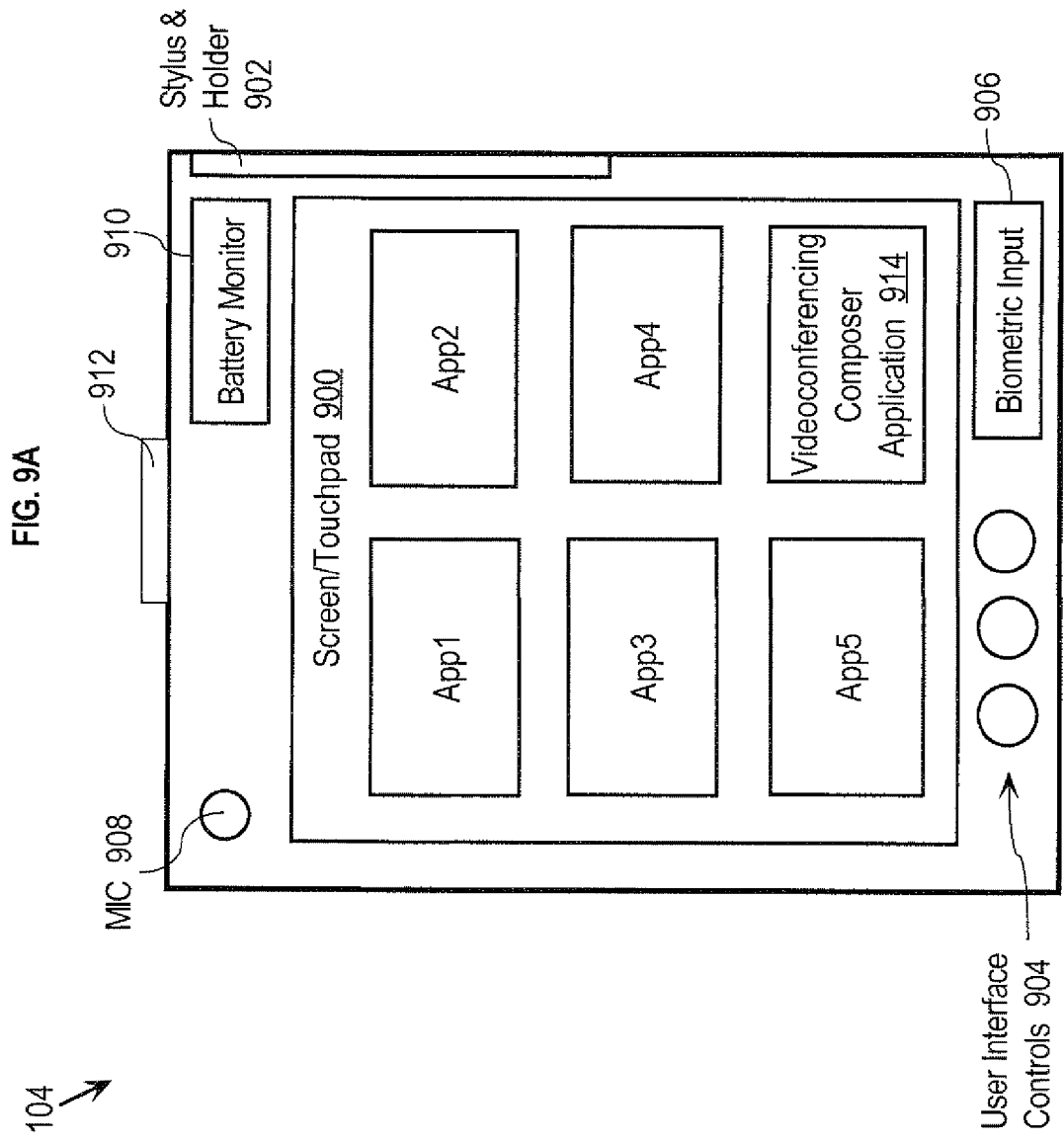
FIG. 9A is a block diagram that depicts an example embodiment of a mobile device.

FIG. 9A is a block diagram that depicts an example embodiment of mobile device 704. In this example, mobile device 704 includes a screen/touchpad 900 for displaying information to a user and for receiving user input, for example via a stylus 902. Mobile device 704 also includes user interface controls 904 for receiving user input. Examples of user interface controls 904 include, without limitation, buttons, sliders and selectors. Mobile device 704 includes a biometric input 906 for receiving user biometric data, such as a fingerprint, retina scan, etc. Biometric data may be used, for example, to authenticate a user prior to allowing access to mobile device 704. Mobile device 704 includes a microphone, a battery monitor 910 and a data acquisition device 912 attached to the front of mobile device 704. Mobile device 704 includes one or more applications that provide one or more services. As depicted in FIG. 9A, a graphical user interface object for each of the applications is displayed on screen/touchpad 900. In FIG. 9A, the graphical user interface objects identify the application as App1, App2, App3, App4, App5 and videoconferencing composer application 914. Videoconferencing composer application 914 allows a user to use mobile device 704 to easily establish a videoconferencing session among two or more videoconferencing sites.

Figure 9B:
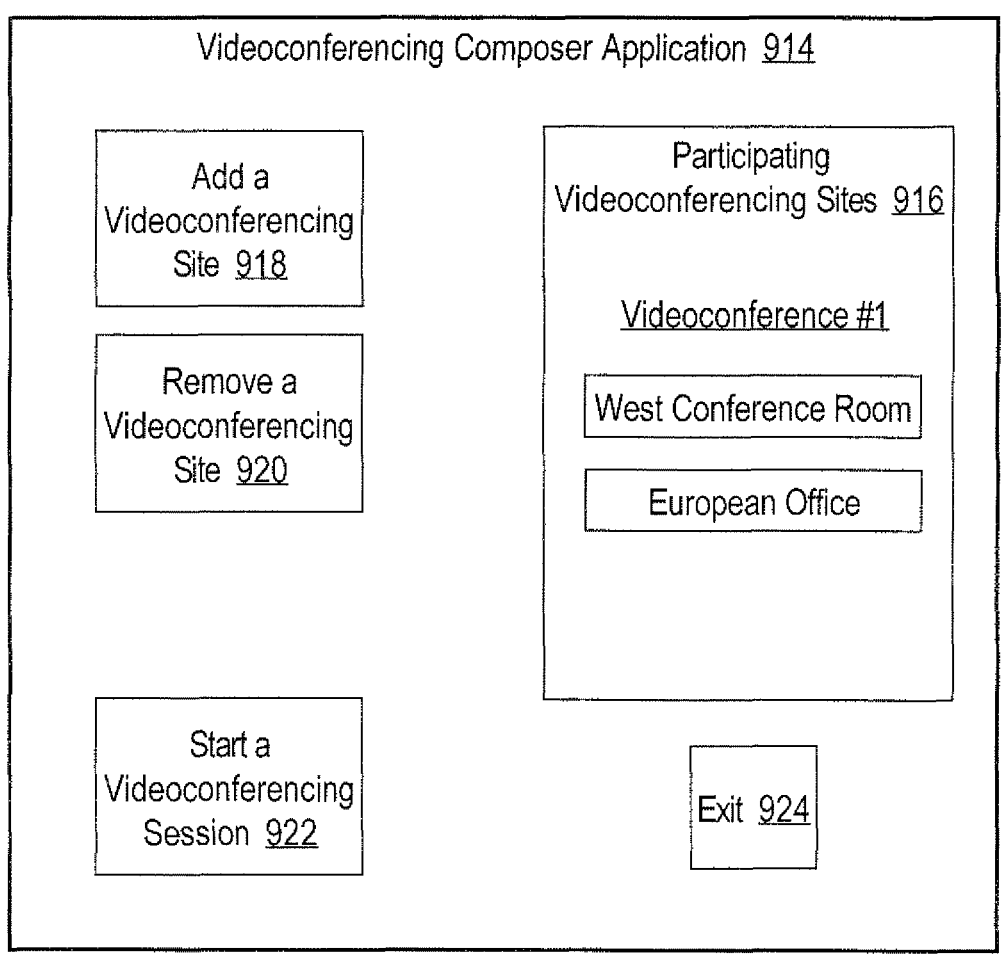
FIG. 9B depicts an example graphical user interface screen generated and displayed on screen/touchpad by videoconferencing composer application.

FIG. 9B depicts an example graphical user interface screen generated and displayed on screen/touchpad 900 by videoconferencing composer application 914. Videoconferencing composer application 914 includes a list 916 of videoconferencing sites that have been selected to participate in a videoconferencing session. In this example, videoconferencing sites "West Conference Room" and "European Office" have been added to the list 916. Videoconferencing composer application 914 includes user interface controls for adding and removing videoconferencing sites from the list 916. The user interface controls include an "Add a Videoconferencing Site" button 918 and a "Remove a Videoconferencing Site" button 920 for adding and removing, respectively, videoconferencing sites from list 916. According to one embodiment, selection of the "Add a Videoconferencing Site" button 918 activates the data acquisition device 912 to enable the data acquisition device 912 to acquire videoconferencing site identification data from a videoconferencing site map. Once the videoconferencing site identification data is acquired from the videoconferencing site map, a graphical user interface object is added to the list 916 of videoconferencing sites for the videoconferencing site that corresponds to the acquired videoconferencing site identification data. The selection of a graphical user interface object displayed in the list 914 of participating videoconferencing sites in conjunction with the selection of the "Remove a Videoconferencing Site" button 920 causes the deletion of the graphical user interface object displayed in the list 914 of participating videoconferencing sites along with the corresponding acquired videoconferencing site identification data.

The user interface controls on videoconferencing composer application 914 also include a "Start a Videoconferencing Session" button 922 which, when selected, causes a videoconferencing session to be initiated between the videoconferencing sites indicated in the list 914 of participating videoconferencing sites. An "Exit" button 924 allows a user to exit the videoconferencing composer application 914. The videoconferencing composer application 914 may include other controls and functionality that may vary depending upon a particular implementation and embodiments are not limited to the particular controls and functionality depicted in FIG. 9B. One non-limiting example is that the videoconferencing composer application 914 may include user interface controls that allow a user to select a type of connection to be made between the participating sites. For example, the user interface controls may allow a user to select a voice connection, a data connection, a videoconferencing session, a shared whiteboard session, etc.

VIII. Establishing a Videoconferencing Session Using Mobile Devices

FIG. 10 is a flow diagram 1000 that depicts an approach for establishing a videoconferencing session using a mobile device. In step 1002, the videoconferencing composer application is initiated on the mobile device. For example, a user may select on the screen/touchpad 900 a graphical user interface object associated with the videoconferencing composer application 914 to initiate the videoconferencing composer application 914.

In step 1004, a determination is made whether a request has been received to add a videoconferencing site. For example, a user may select the "Add a Videoconferencing Site" button 918 displayed on the screen/touchpad 900 to request that a videoconferencing site be added to the list 916 of participating videoconferencing sites. If so, then in step 1006, videoconferencing site identification data is acquired and the list 916 of participating videoconferencing sites is updated to indicate that the corresponding videoconferencing site has been added. For example, a user may physically position the mobile device 704 in close proximity to the QR code 802 and select the "Add a Videoconferencing Site" button 918 displayed on the screen/touchpad 900 to cause the data acquisition device 912 to scan the QR code and acquire the videoconferencing site identification data for the "West Conference Room" videoconferencing site. As an alternative, the user may first select the "Add a Videoconferencing Site" button 918 to activate the data acquisition device 912 and then physically position the mobile device 704 in close proximity to the QR code 802 to allow the data acquisition device 912 to acquire the videoconferencing site identification data for the "West Conference Room" videoconferencing site. The mobile device 704 stores the videoconferencing site identification data and updates the list 916 of participating videoconferencing sites to indicate that the videoconferencing site has been added. According to one embodiment, after a particular videoconferencing site is added, a determination is made whether the particular videoconferencing site is currently ready and available to participate in a videoconferencing session. If not, then the user is notified, for example, via the screen/touchpad 900. The user may be given an option to not add the particular videoconferencing site and to add another videoconferencing site.

The process then proceeds to step 1008 in which a determination is made whether a request has been received to remove a videoconferencing site. For example, a user may select a graphical user interface object displayed in the list 916 of participating videoconferencing sites and then select the "Remove a Videoconferencing Site" button 920 displayed on the screen/touchpad 900 to request that the selected videoconferencing site be removed from the list 916 of participating videoconferencing sites. If so, then in step 1010, the videoconferencing site identification data for the selected videoconferencing site is deleted from the mobile device 704 and the graphical user interface object is deleted from the list 916 of participating videoconferencing sites.

In step 1012, a determination is made whether a request has been received to start a videoconferencing session. For example, a user may select the "Start a Videoconferencing Session" button 922 displayed on the screen/touchpad 900 to request that a videoconferencing session be started. If so, then in step 1014, a request to initiate a videoconferencing session is transmitted to the videoconferencing session manager 712 on the videoconferencing system 702. The request may be, for example, an SIP INVITE request. The request includes the videoconferencing site identification data for the videoconferencing sites on the list 916 of participating videoconferencing sites. The videoconferencing session manager 712 processes the request and generates and transmits messages to the videoconferencing session agent 708 on each of the videoconferencing sites that will be participating in the videoconferencing session. The videoconferencing session agent 708 on each of the participating videoconferencing sites processes the message and establishes the videoconferencing session. The videoconferencing session agent 708 on each of the participating videoconferencing sites may also update its corresponding videoconferencing session data 710 to indicate that the videoconferencing session was established.

Once the videoconferencing session has been successfully initiated, the videoconferencing session manager 712 updates the videoconferencing session data 716 to indicate the videoconferencing session has been successfully initiated. The videoconferencing session manager 712 may provide confirmation data to the mobile device 704 confirming that the videoconferencing session was successfully initiated. In response to receiving the confirmation data, the mobile device 704 may display a message, or otherwise indicate, via videoconferencing composer application 914 that the videoconferencing session was successfully initiated. In step 1016, the videoconferencing composer application 914 is then ended.

If in step 1012, a request has not been received to start a videoconferencing session, then in step 1018, a determination is made whether a request has been received to exit the videoconferencing composer application 914. For example, a user may select the "Exit" button 924 to indicate a request to exit the videoconferencing composer application 914. If a request has been received to exit the videoconferencing composer application 914, then the videoconferencing composer application 914 is ended in step 1016. If not, then the process continues in step 1004.

Although the flow diagram 1000 of FIG. 10 depicts an example order of steps, embodiments are not limited to this example order and the steps depicted in FIG. 10 may be performed in different orders depending upon a particular implementation. In addition, numerous variations and extensions may be implemented. For example, once a videoconferencing session has been initiated, the videoconferencing composer application 914 does not have to be ended and may continue to execute, for example, to provide status on the videoconferencing session. The videoconferencing composer application 914 may provide a visual indication on the screen/touchpad 900 of the status of the videoconferencing session, along with other information, such as a current time duration, various quality metrics, etc., of the videoconferencing session. The videoconferencing composer application 914 may also indicate users of the videoconferencing session, i.e., users of the participating videoconferencing sites that were included when the videoconferencing session was initiated.

The videoconferencing composer application 914 may also allow actions to be taken with respect to videoconferencing session in progress. For example, videoconferencing sites may be added to or removed from a videoconferencing session in progress via the videoconferencing composer application 914. This may be accomplished, for example, using the "Add a Videoconferencing Site" button 918 and the "Remove a Videoconferencing Site" button 920. As another example, a videoconferencing session in progress may be terminated via the mobile device 704. The videoconferencing composer application 914 may provide a graphical user interface object in the form of an "End Videoconferencing Session" button which, when selected, causes the videoconferencing composer application 914 to generate and transmit to the videoconferencing system 702 a command to terminate the videoconferencing session.

Figure 9C:
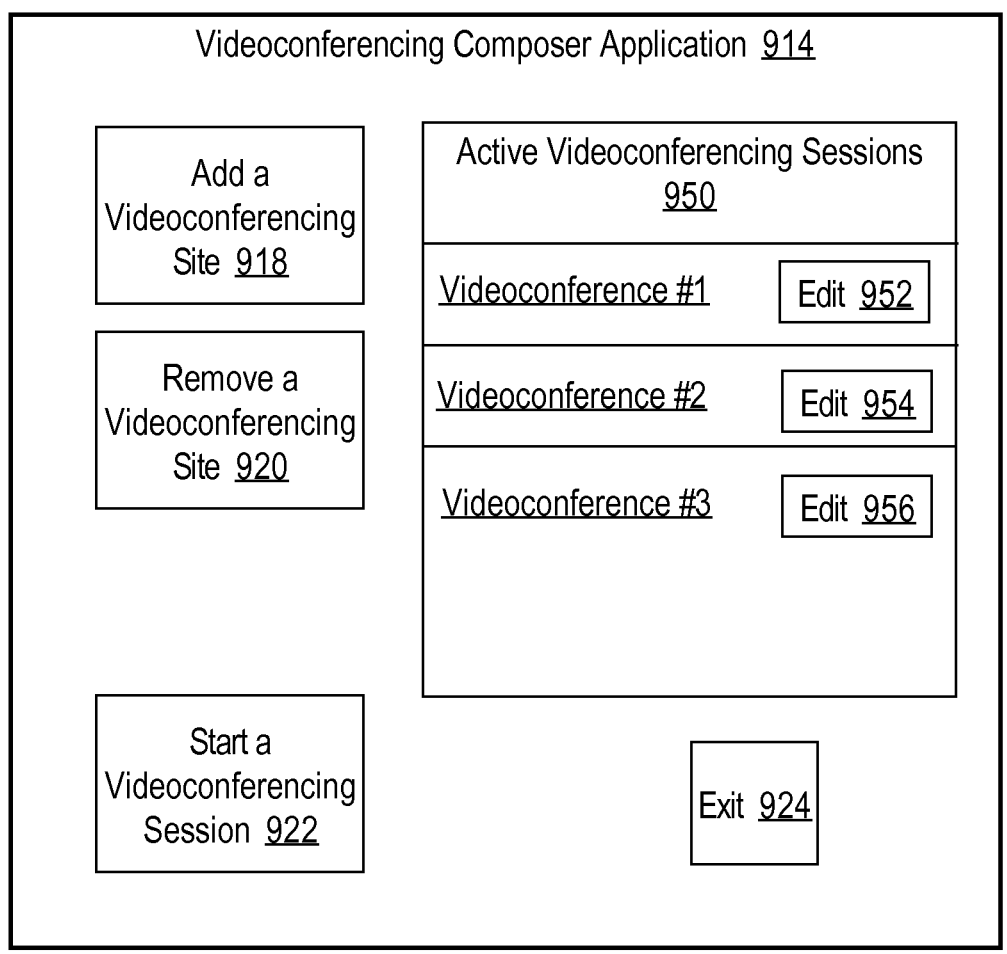
FIG. 9C depicts a videoconferencing composer application with a box that shows active videoconferencing sessions.

FIG. 9C depicts videoconferencing composer application 914 with a box 950 that shows the active videoconferencing sessions. In this example, there are three active videoconferencing sessions identified as "Videoconference #1", "Videoconference #2" and "Videoconference #3". Each of these active videoconferencing sessions has a corresponding "Edit" button 952, 954, 956, respectively, which, when selected, provides access to a set of user interface controls (not depicted) for the videoconferencing session. These controls may allow a user to, for example, obtain detailed status information about an active videoconferencing session, add or remove videoconferencing sites to/from an active videoconferencing session or terminate an active videoconferencing session.

FIG. 11 is a diagram 1100 that depicts an example exchange of messages between elements of videoconferencing arrangement 700 when establishing a videoconferencing session according to an embodiment. A user of mobile device 704 makes a request 1102 to initiate the videoconferencing composer application 914, for example, by selecting on screen/touchpad 900 an icon associated with the videoconferencing composer application 914. In response to the request 1102, in step 1104, the mobile device 704 initiates the videoconferencing composer application 914. The videoconferencing composer application 914 provides several options with respect to initiating videoconferencing sessions, for example, the options described herein with respect to FIG. 9B.

In step 1106, the user makes a request to add a videoconferencing site, for example, by selecting the "Add a Videoconferencing Site" button 918 on the videoconferencing composer application 914. In step 1108, the mobile device 704 acquires encoded videoconferencing site identification data for a first videoconferencing site. For example, the user moves the mobile device 704 in proximity to the videoconferencing site map 706 to enable the data acquisition device 912 to read or scan encoded videoconferencing site identification data for videoconferencing site VCS1. The mobile device may also decode the encoded videoconferencing site identification data for videoconferencing site VCS1 to obtain the original videoconferencing site identification data for videoconferencing site VCS1. After successfully acquiring and decoding the encoded videoconferencing site identification data for videoconferencing site VCS1, the mobile device 704 may provide a confirmation to the user via the videoconferencing composer application 914, for example, by providing a visual or audible notification.

In step 1110, the user makes a request to add another videoconferencing site, for example, by again selecting the "Add a Videoconferencing Site" button 918 on the videoconferencing composer application 914. In step 1112, the mobile device 704 acquires encoded videoconferencing site identification data for a second videoconferencing site. For example, the user moves the mobile device 704 in proximity to the videoconferencing site map 706 to enable the data acquisition device 912 to read or scan encoded videoconferencing site identification data for videoconferencing site VCS6. The mobile device may also decode the encoded videoconferencing site identification data for videoconferencing site VCS6 to obtain the original videoconferencing site identification data for videoconferencing site VCS6. After successfully acquiring and decoding the second encoded videoconferencing site identification data for videoconferencing site VCS6, the mobile device 704 may provide a confirmation to the user via the videoconferencing composer application 914, for example, by providing a visual or audible notification.

In step 1114, the user requests to start a videoconferencing session 1114, for example, by selecting the "Start a Videoconferencing Session" button 922 on the videoconferencing composer application 914. In response to this request, in step 1116 the videoconferencing composer application 720 on the mobile device 704 sends a request to start the videoconferencing session to the videoconferencing session manager 712 on the videoconferencing system 702. The request includes the videoconferencing site identification data for videoconferencing sites VCS1 and VCS6. In response to receiving this request, in step 1118, the videoconferencing session manager 712 transmits commands to the videoconferencing session agent 708 on both videoconferencing sites VCS1 and VCS6 to initiate the videoconferencing session between videoconferencing sites VCS1 and VCS6. For example, videoconferencing sessions may be established using the SIP. The videoconferencing composer application 720 may receive from the videoconferencing session agents 708 on the videoconferencing sites VCS1 and VCS6 (either or both) confirmation that the videoconferencing session was established between videoconferencing sites VCS1 and VCS6. In step 1120, the videoconferencing session manager 712 generates and transmits to the mobile device 704 a confirmation message confirming that the videoconferencing session was established between videoconferencing sites VCS1 and VCS6 and the videoconferencing composer application 914 may provide a visual or audible indication to the user confirming that the videoconferencing session was established.

As an alternative to step 1116 in which the videoconferencing composer application 720 on the mobile device 704 sends a request to start the videoconferencing session to the videoconferencing session manager 712 on the videoconferencing system 702, in step 1122, videoconferencing composer application 720 on the mobile device 704 sends a request to start the videoconferencing session directly to the videoconferencing session agents 708 on the videoconferencing sites VCS1 and VCS6. In step 1124, the videoconferencing session agents 708 on either one or both of videoconferencing sites VCS1 and VCS6 generate and transmit to the videoconferencing composer application 720 on the mobile device 704 a confirmation message confirming that the videoconferencing session was established between videoconferencing sites VCS1 and VCS6.

IX. Using Encoded Data to Provide Access to Information

The approach described herein for using encoded data to provide connections between audio/video equipment may also be used to provide access to information in other ways. For example, data that identifies a set of data files and corresponding encoded identifiers may be displayed on a graphical user interface of a computing device. Example identifiers include, without limitation, a file identifier, a URL, a short URL, or a combined file name and directory path. The encoding may be performed using a wide variety of encoding techniques that may vary depending upon a particular implementation and the approach is not limited to any particular encoding technique. Example encodings include, without limitation, a QR code, a UPC code, a barcode, a color-differentiated code and a three-dimensional code. Example computing devices include, without limitation, a desktop computer, a video screen and an electronic whiteboard. According to one embodiment, the data files included in the set of data files are data files that are capable of being displayed on a computing device, for example, a mobile device.

The data description that identifies the data files and corresponding encoded identifiers may be displayed on a single viewable page, or on multiple viewable pages, depending upon a particular implementation. For example, the data description that identifies the data files and corresponding encoded identifiers may be displayed as a list on one or more Web pages, e.g., a list of data file names with an encoded identifier next to each data file name. Selection of a particular encoded identifier causes the corresponding data file to be retrieved and displayed on a computing device. For example, a user of a mobile device configured with a scanner may scan a particular encoded identifier adjacent a particular data description to cause the corresponding data file to be displayed on the user's mobile device. Causing the corresponding data file to be displayed on the user's mobile device may include, for example, playing a video file, displaying an image file, displaying a picture, displaying a PDF file or playing a music file. This approach uses encoded data to provide for the touch-free display of information on devices.

Figure 12:
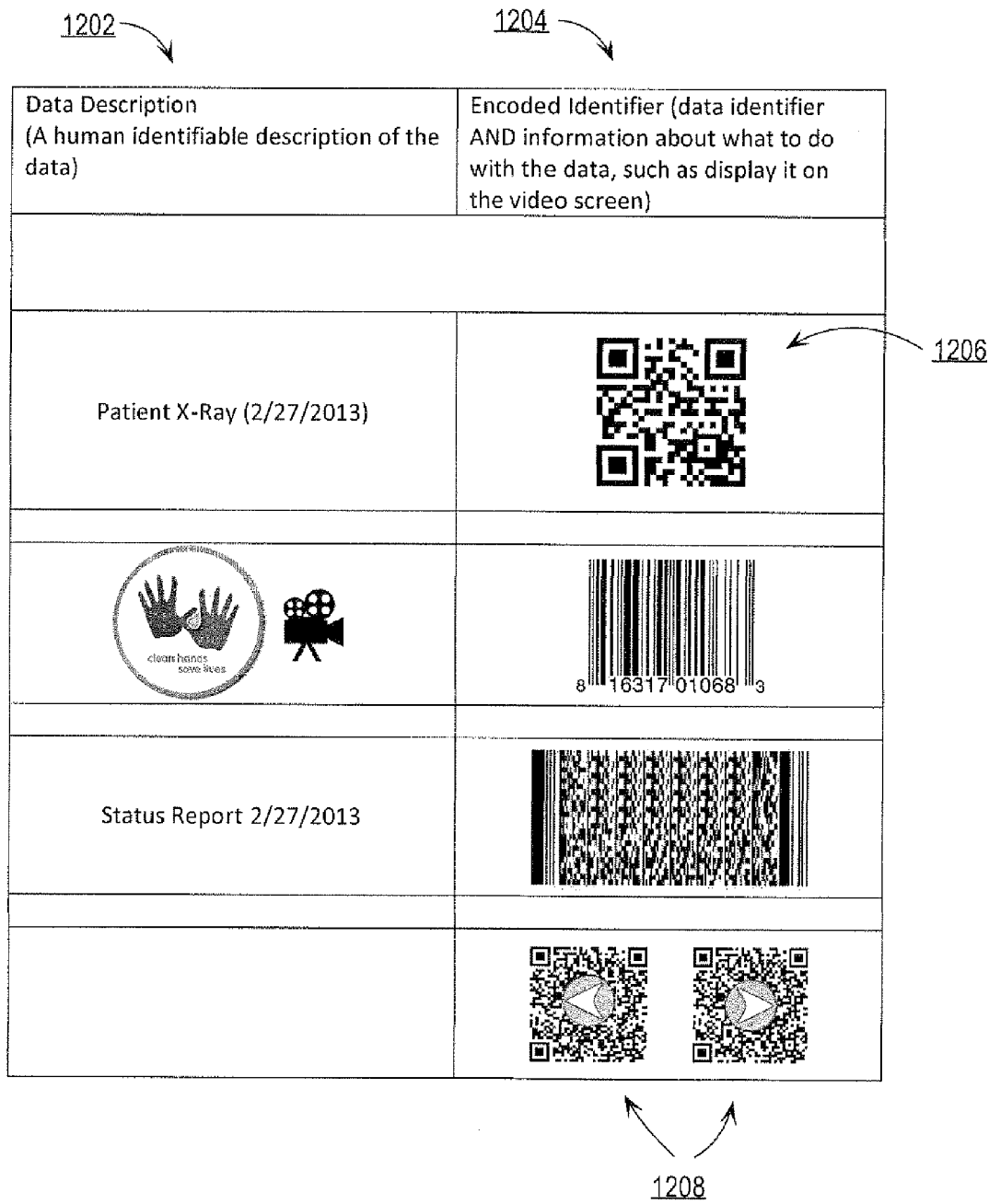
FIG. 12 is a diagram that depicts an approach for using encoded data to provide access to information.

FIG. 12 depicts a table 1200 that uses encoded data to provide access to information. Table 1200 may be displayed on a display device and includes a column 1202 of data descriptions that provide a human-identifiable description of data. Column 1204 includes a set of encoded data items that correspond to the descriptions in column 1202. Acquiring and decoding the encoded data in column 1204 provides access to the data described in column 1202. For example, scanning the encoded data item 1206 provides access to the Patient X-Ray from Feb. 27, 2013.

Navigation controls may also be provided using encoded data. Selection of the navigation controls causes a corresponding navigation action to occur. For example, a user of a mobile device configured with a data acquisition element, such as a scanner, may scan a particular encoded data item to navigate to a next page of data file descriptions and corresponding encoded identifiers. Similarly, the user may select another encoded data item to navigate to a prior page of data files descriptions and corresponding encoded identifiers. For example, FIG. 12 includes navigation controls 1208 which, when selected, for example by scanning, allow navigation to other pages that contain a table similar to table 1200.

X. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
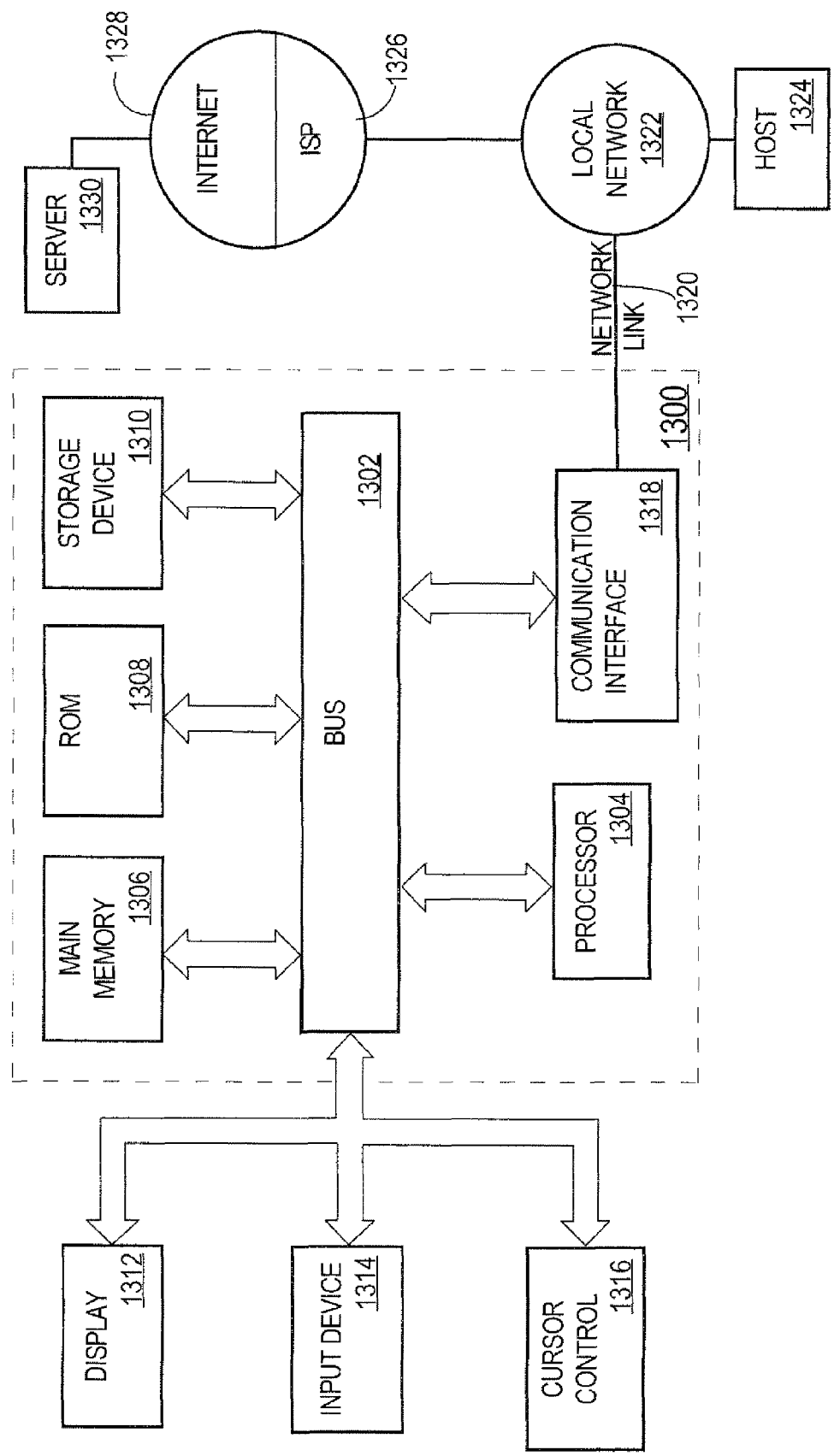
FIG. 13 is a block diagram that depicts an example computer system upon which embodiments may be implemented.

FIG. 13 is a block diagram that depicts an example computer system 1300 upon which embodiments may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. Although bus 1302 is illustrated as a single bus, bus 1302 may comprise one or more buses. For example, bus 1302 may include without limitation a control bus by which processor 1304 controls other devices within computer system 1300, an address bus by which processor 1304 specifies memory locations of instructions for execution, or any other type of bus for transferring data or signals between components of computer system 1300.

An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic or computer software which, in combination with the computer system, causes or programs computer system 1300 to be a special-purpose machine. According to one embodiment, those techniques are performed by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1300, various computer-readable media are involved, for example, in providing instructions to processor 1304 for execution. Such a medium may take many forms, including but not limited to, non-volatile media and volatile media. Non-volatile media includes, for example, optical or magnetic disks, such as storage device 1310. Volatile media includes dynamic memory, such as main memory 1306. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating a location map, the method comprising:
   retrieving first audio/video equipment identification data that uniquely identifies first audio/video equipment that is capable of participating in a video conferencing session and specifies sufficient information for the first audio/video equipment to participate in a video conferencing session, and second audio/video equipment identification data that uniquely identifies second audio/video equipment that is capable of participating in a video conferencing session and specifies sufficient information for the second audio/video equipment to participate in a video conferencing session, wherein the second audio/video equipment is different than the first audio/video equipment and wherein the second audio/video equipment identification data is different than the first audio/video equipment identification data; and
   generating locations map data that includes the first audio/video equipment identification data, first encoded audio/video equipment identification data that uniquely identifies the first audio/video equipment and specifies the sufficient information for the first audio/video equipment to participate in a video conferencing session, the second audio/video equipment identification data and second encoded audio/video equipment identification data that uniquely identifies the second audio/video equipment and specifies the sufficient information for the second audio/video equipment to participate in a video conferencing session,
   wherein processing of the locations map data causes the first audio/video equipment, the first encoded audio/video equipment identification data that uniquely identifies the first audio/video equipment and specifies sufficient information for the first audio/video equipment to participate in a video conferencing session, the second audio/video equipment and the second encoded audio/video equipment identification data that uniquely identifies the second audio/video equipment and specifies sufficient information for the second audio/video equipment to participate in a video conferencing session to be visually depicted on a locations map displayed on a user interface of a computing device, and
   wherein a videoconferencing system uses the information specified by the first encoded audio/video equipment identification data and the information specified by the second encoded audio/video equipment identification data visually depicted on the locations map to establish a videoconferencing session between the first audio/video equipment and the second audio/video equipment.

2. The method of claim 1, further comprising:
   generating the first encoded audio/video equipment identification data based upon the first audio/video equipment identification data, wherein the first encoded audio/video equipment identification data is in a form that is readable by a machine or electronic device;
   generating the second encoded audio/video equipment identification data based upon the second audio/video equipment identification data, wherein the second encoded audio/video equipment identification data is in a form that is readable by a machine or electronic device and wherein the second encoded audio/video equipment identification data is different than the first encoded audio/video equipment identification data; and
   wherein processing of the locations map data causes the first encoded audio/video equipment identification data to be displayed in association with the first audio/video equipment and the second encoded audio/video equipment identification data to be displayed in association with the second audio/video equipment.

3. The method of claim 2, wherein the first encoded audio/video equipment identification data and the second encoded audio/video equipment identification data are encoded in a form that includes one or more of a QR code, a UPC code, a barcode, RFID tag data, a color-differentiated code or a three-dimensional code.

4. The method of claim 1, further comprising:
   generating first location data that indicates a location of the first audio/video equipment;
   generating second location data that indicates a location of the second audio/video equipment; and
   including the first location data and the second location data in the locations map data, wherein processing of the locations data causes, to be displayed on the user interface, data that indicates the location of the first audio/video equipment and the location of the second audio/video equipment.

5. The method of claim 4, further comprising determining the location of the first audio/video equipment by one or more of reading gps data from a gps device associated with the first audio/video equipment, retrieving the location of the first audio/video equipment from the first audio/video equipment identification data, or by determining the location of the first audio/video equipment based upon a location of other audio/video equipment.

6. The method of claim 4, further comprising depicting the first audio/video equipment and the second audio/video equipment on the user interface in a manner that indicates one or more of an absolute position or a relative position of the first audio/video equipment and the second audio/video equipment with respect to one or more buildings.

7. The method of claim 1, wherein the sufficient information for the first audio/video equipment to participate in a video conferencing session includes one or more of an Internet Protocol (IP) address, a Media Access Control (MAC) address or a Uniform Resource Locator (URL) and the sufficient information for the second audio/video equipment to participate in a video conferencing session includes one or more of an Internet Protocol (IP) address, a Media Access Control (MAC) address or a Uniform Resource Locator (URL).

8. The method of claim 1, further comprising storing additional information about one or more of the first audio/video equipment or the second audio/video equipment, wherein the additional information includes a type of audio/video equipment.

9. The method of claim 1, wherein generating the locations map data includes one or more of generating scaled locations map data or generating locations map data in a particular orientation.

10. The method of claim 1, further comprising re-generating and re-displaying the locations map data in response to one or more of a change in the first audio/video equipment identification data or the second audio/video equipment identification data.

11. A method comprising:
a mobile device selecting and obtaining network address information for a first audio/video device and a second audio/video device from a locations map that is projected on a surface by scanning first encoded data and second encoded data from the locations map that is projected on the surface, wherein the first encoded data corresponds to the first audio/video device and specifies a network address for the first audio/video device and the second encoded data corresponds to the second audio/video device and specifies a network address for the second audio/video device; and
in response to the selection of the first audio/video device and the second audio/video device from the locations map that is projected on the surface, the mobile device automatically causing a video conferencing session to be established between the first audio/video device and the second audio/video device by transmitting the network address for the first audio/video device and the network address for the second audio/video device, via one or more networks, to a videoconferencing system that uses the network address of the first audio/video device and the network address for the second audio/video device to establish a videoconferencing session between the first audio/video device and the second audio/video device.

12. The method of claim 11, wherein the first network address and the second network address are Internet Protocol (IP) addresses.

13. The method of claim 11, wherein the first encoded data and the second encoded data are each encoded as a bar code or a QR code.

14. An apparatus comprising:
one or more processors; and
one or more memories storing instructions which, when processed by the one or more processors, cause:
retrieving first audio/video equipment identification data that uniquely identifies first audio/video equipment that is capable of participating in a video conferencing session and specifies sufficient information for the first audio/video equipment to participate in a video conferencing session, and second audio/video equipment identification data that uniquely identifies second audio/video equipment that is capable of participating in a video conferencing session and specifies sufficient information for the second audio/video equipment to participate in a video conferencing session, wherein the second audio/video equipment is different than the first audio/video equipment and wherein the second audio/video equipment identification data is different than the first audio/video equipment identification data; and
generating locations map data that includes the first audio/video equipment identification data, first encoded audio/video equipment identification data that uniquely identifies the first audio/video equipment and specifies the sufficient information for the first audio/video equipment to participate in a video conferencing session, the second audio/video equipment identification data and second encoded audio/video equipment identification data that uniquely identifies the second audio/video equipment and specifies the sufficient information for the second audio/video equipment to participate in a video conferencing session,
wherein processing of the locations map data causes the first audio/video equipment, the first encoded audio/video equipment identification data that uniquely identifies the first audio/video equipment and specifies sufficient information for the first audio/video equipment to participate in a video conferencing session, the second audio/video equipment and the second encoded audio/video equipment identification data that uniquely identifies the second audio/video equipment and specifies sufficient information for the second audio/video equipment to participate in a video conferencing session to be visually depicted on a locations map displayed on a user interface of a computing device, and
wherein a videoconferencing system uses the information specified by the first encoded audio/video equipment identification data and the information specified by the second encoded audio/video equipment identification data visually depicted on the locations map to establish a videoconferencing session between the first audio/video equipment and the second audio/video equipment.

15. The apparatus of claim 14, wherein the one or more memories store additional instructions which, when processed by the one or more processors, cause:
generating the first encoded audio/video equipment identification data based upon the first audio/video equipment identification data, wherein the first encoded audio/video equipment identification data is in a form that is readable by a machine or electronic device;
generating the second encoded audio/video equipment identification data based upon the second audio/video equipment identification data, wherein the second encoded audio/video equipment identification data is in a form that is readable by a machine or electronic device and wherein the second encoded audio/video equipment identification data is different than the first encoded audio/video equipment identification data; and wherein processing of the locations map data causes the first encoded audio/video equipment identification data to be displayed in association with the first audio/video equipment and the second encoded audio/video equipment identification data to be displayed in association with the second audio/video equipment.

16. The apparatus of claim 15, wherein the first encoded audio/video equipment identification data and the second encoded audio/video equipment identification data are encoded in a form that includes one or more of a QR code, a UPC code, a barcode, RFID tag data, a color-differentiated code or a three-dimensional code.

17. The apparatus of claim 14, wherein the one or more memories store additional instructions which, when processed by the one or more processors, cause:
   generating first location data that indicates a location of the first audio/video equipment;
   generating second location data that indicates a location of the second audio/video equipment; and
   including the first location data and the second location data in the locations map data,
      wherein processing of the locations data causes, to be displayed on the user interface, data that indicates the location of the first audio/video equipment and the location of the second audio/video equipment.

18. The apparatus of claim 17, wherein the one or more memories store additional instructions which, when processed by the one or more processors, cause determining the location of the first audio/video equipment by one or more of reading gps data from a gps device associated with the first audio/video equipment, retrieving the location of the first audio/video equipment from the first audio/video equipment identification data, or by determining the location of the first audio/video equipment based upon a location of other audio/video equipment.

19. The apparatus of claim 17, wherein the one or more memories store additional instructions which, when processed by the one or more processors, cause depicting the first audio/video equipment and the second audio/video equipment on the user interface in a manner that indicates one or more of an absolute position or a relative position of the first audio/video equipment and the second audio/video equipment with respect to one or more buildings.

20. The apparatus of claim 14, wherein the sufficient information for the first audio/video equipment to participate in a video conferencing session includes one or more of an Internet Protocol (IP) address, a Media Access Control (MAC) address or a Uniform Resource Locator (URL) and the sufficient information for the second audio/video equipment to participate in a video conferencing session includes one or more of an Internet Protocol (IP) address, a Media Access Control (MAC) address or a Uniform Resource Locator (URL).

* * * * *